(12) United States Patent
Tsutsumi et al.

(10) Patent No.: US 10,193,107 B2
(45) Date of Patent: Jan. 29, 2019

(54) ELECTRIC STORAGE DEVICE AND ELECTRIC STORAGE APPARATUS PROVIDED WITH THE ELECTRIC STORAGE DEVICE

(71) Applicants: GS YUASA INTERNATIONAL LTD., Kyoto-shi (JP); HONDA MOTOR CO., LTD., Minato-ku (JP)

(72) Inventors: Masakazu Tsutsumi, Kyoto (JP); Takuma Tonari, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 50 days.

(21) Appl. No.: 14/777,460

(22) PCT Filed: Mar. 25, 2014

(86) PCT No.: PCT/JP2014/058258
§ 371 (c)(1),
(2) Date: Sep. 15, 2015

(87) PCT Pub. No.: WO2014/157191
PCT Pub. Date: Oct. 2, 2014

(65) Prior Publication Data
US 2016/0043353 A1 Feb. 11, 2016

(30) Foreign Application Priority Data
Mar. 26, 2013 (JP) .................. 2013-065120

(51) Int. Cl.
*H01M 2/02* (2006.01)
*H01M 2/20* (2006.01)
(Continued)

(52) U.S. Cl.
CPC .............. *H01M 2/02* (2013.01); *H01G 11/22* (2013.01); *H01G 11/74* (2013.01); *H01G 11/80* (2013.01);
(Continued)

(58) Field of Classification Search
None
See application file for complete search history.

(56) References Cited

U.S. PATENT DOCUMENTS

| 5,585,207 A | 12/1996 | Wakabe et al. |
| 6,136,464 A | 10/2000 | Wakabe et al. |

(Continued)

FOREIGN PATENT DOCUMENTS

| JP | H 08-77999 A | 3/1996 |
| JP | 2001-084991 A | 3/2001 |

(Continued)

OTHER PUBLICATIONS https://www.merriam-webster.com/dictionary/rivet.*

(Continued)

*Primary Examiner* — Jonathan G Leong
*Assistant Examiner* — Christopher P Domone
(74) *Attorney, Agent, or Firm* — McGinn I.P. Law Group, PLLC.

(57) ABSTRACT

Provided is an electric storage device and an electric storage apparatus capable of suppressing an increase in thickness of a conductive member due to a rivet member being swaged. The present invention includes a rivet member provided with an insert part, and a conductive member provided with an insert-receiving part through which the insert part is inserted. The insert part has a higher Vickers hardness than the peripheral region of the insert-receiving part.

16 Claims, 14 Drawing Sheets

(51) Int. Cl.
*H01G 11/82* (2013.01)
*H01G 11/22* (2013.01)
*H01G 11/80* (2013.01)
*H01M 10/0525* (2010.01)
*H01G 11/74* (2013.01)
*H01M 2/06* (2006.01)
*H01M 2/30* (2006.01)
*H01G 11/10* (2013.01)

(52) U.S. Cl.
CPC .......... *H01G 11/82* (2013.01); *H01M 2/0202* (2013.01); *H01M 2/0237* (2013.01); *H01M 2/06* (2013.01); *H01M 2/202* (2013.01); *H01M 2/204* (2013.01); *H01M 2/206* (2013.01); *H01M 2/305* (2013.01); *H01M 10/0525* (2013.01); *H01G 11/10* (2013.01); *H01M 2220/20* (2013.01); *H01M 2220/30* (2013.01); *Y02E 60/13* (2013.01); *Y02T 10/7022* (2013.01)

(56) References Cited

U.S. PATENT DOCUMENTS

| | | | |
|---|---|---|---|
| 6,579,640 | B1 | 6/2003 | Nagase et al. |
| 2008/0241679 | A1* | 10/2008 | Okutani ................ H01M 2/06 429/185 |
| 2009/0202901 | A1 | 8/2009 | Okuda et al. |
| 2010/0092858 | A1* | 4/2010 | Takashiro ............ H01M 2/021 429/178 |
| 2011/0045345 | A1 | 2/2011 | Tsuchiya et al. |
| 2011/0076552 | A1 | 3/2011 | Taniguchi et al. |
| 2011/0281155 | A1* | 11/2011 | Ito ....................... H01M 2/0473 429/179 |
| 2012/0148908 | A1 | 6/2012 | Ito |
| 2012/0148911 | A1 | 6/2012 | Suzuki et al. |
| 2012/0164522 | A1 | 6/2012 | Kawamoto et al. |
| 2012/0183845 | A1 | 7/2012 | Kawamoto et al. |
| 2012/0189908 | A1 | 7/2012 | Tsutsumi et al. |
| 2012/0196178 | A1 | 8/2012 | Kambayashi et al. |
| 2012/0264007 | A1 | 10/2012 | Sasaki et al. |
| 2012/0264008 | A1 | 10/2012 | Okamoto et al. |
| 2012/0270085 | A1 | 10/2012 | Taniguchi et al. |
| 2014/0242439 | A1* | 8/2014 | Hattori ................ H01M 2/30 429/121 |
| 2014/0295251 | A1* | 10/2014 | Horikoshi ............ H01M 2/30 429/158 |
| 2015/0349347 | A1* | 12/2015 | Oda ..................... H01M 4/662 429/245 |

FOREIGN PATENT DOCUMENTS

| | | | |
|---|---|---|---|
| JP | 2001-093486 | A | 4/2001 |
| JP | 2002-323020 | A | 11/2002 |
| JP | 2008-192552 | A | 8/2008 |
| JP | 2008-251411 | A | 10/2008 |
| JP | 2009-193787 | A | 8/2009 |
| JP | 2009-252395 | A | 10/2009 |
| JP | 2009-283256 | A | 12/2009 |
| JP | 2009-289589 | A | 12/2009 |
| JP | 2010-097732 | A | 4/2010 |
| JP | 2010-097764 | A | 4/2010 |
| JP | 2010-097822 | A | 4/2010 |
| JP | 2010-277797 | A | 12/2010 |
| JP | 2011-076867 | A | 4/2011 |
| JP | 2011-159450 | A | 8/2011 |
| JP | 2011-210473 | A | 10/2011 |
| JP | 2012-079516 | A | 4/2012 |
| JP | 2012-124132 | A | 6/2012 |
| JP | 2012-138342 | A | 7/2012 |
| JP | 2012-151097 | A | 8/2012 |
| JP | 2012-160313 | A | 8/2012 |
| JP | 2012-164634 | A | 8/2012 |
| JP | 2012-164637 | A | 8/2012 |
| JP | 2012-209261 | A | 10/2012 |
| JP | 2013-045602 | A | 3/2013 |
| JP | 2013-051185 | A | 3/2013 |

OTHER PUBLICATIONS https://www.merriam-webster.com/dictionary/nut.*
International Preliminary Report on Patentability in PCT Application No. PCT/JP2014/058258 dated Oct. 8, 2015 with an English translation thereof.
International Search Report (ISR) (PCT Form PCT/ISA/210), in PCT/JP2014/058258, dated Jun. 10, 2014.

* cited by examiner

F I G . 1
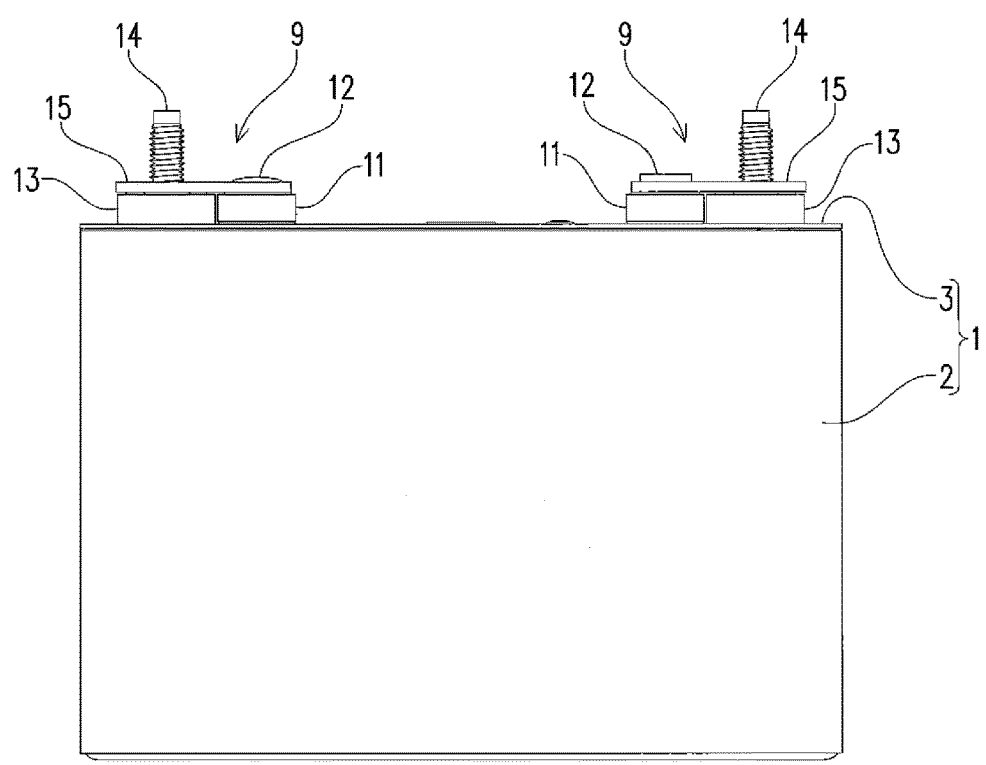

F I G . 3
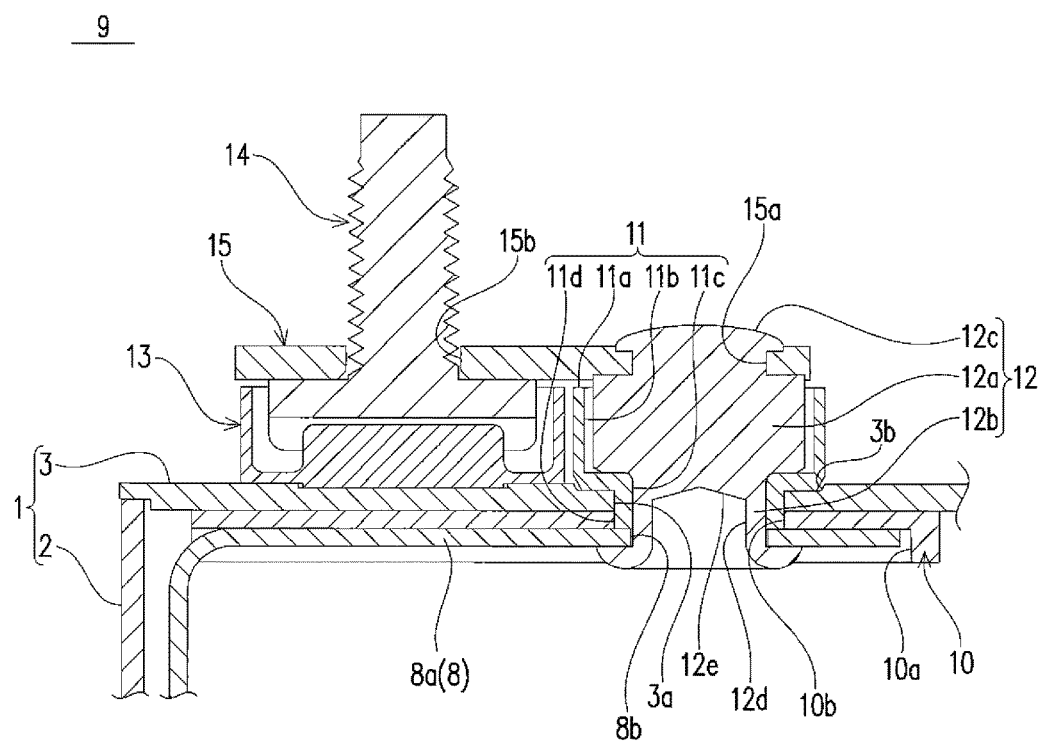

F I G . 13
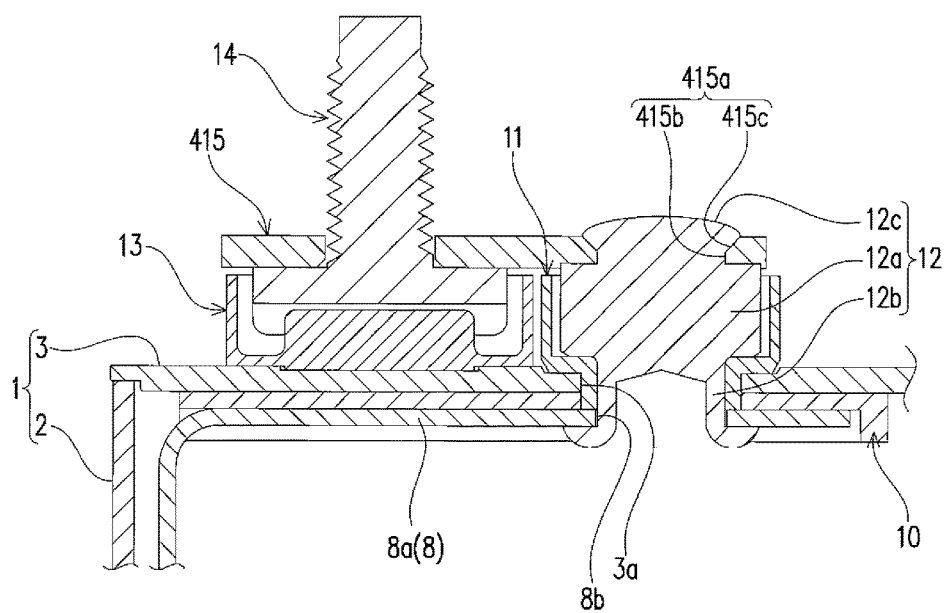

F I G . 14
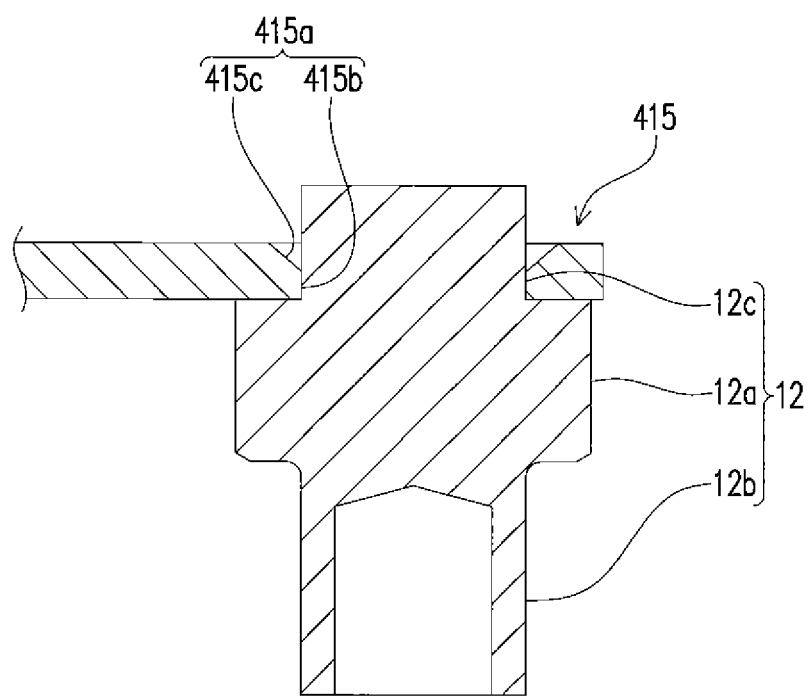

ELECTRIC STORAGE DEVICE AND ELECTRIC STORAGE APPARATUS PROVIDED WITH THE ELECTRIC STORAGE DEVICE

CROSS-REFERENCE TO RELATED APPLICATION

This application claims the benefit of Japanese Patent Application No. 2013-65120, which is incorporated herein by reference.

FIELD

The present invention relates to an electric storage device including an electrode assembly, a case housing the electrode assembly, a rivet member fixed to a partition wall of the case, and a conductive member electrically connected to the rivet member, and to an electric storage apparatus including the electric storage device.

BACKGROUND

In recent years, rechargeable electric storage devices such as battery cells (such as lithium ion battery cells and nickel hydrogen battery cells) and capacitors (such as electric double layer capacitors) are employed as power sources of vehicles (such as automobiles and motorcycles) and various devices (such as mobile terminals and notebook computers). For example, there are various types of battery cells. As one of the types, there is provided a battery cell including an electrode assembly (power generating element), a current collector electrically connected to the electrode assembly, a case (battery case) housing the electrode assembly and the current collector, an external terminal (terminal plate) arranged outside the case, an internal sealing member (gasket) arranged along an inner surface of a partition wall of the case, an external sealing member (gasket) arranged along the outer surface of the partition wall of the case, and a rivet member (terminal) inserted through the partition wall of the case, the internal sealing member, and the external sealing member, wherein the external terminal and the current collector are electrically connected to each other via the rivet member.

The rivet member is composed of a conductive material. The rivet member includes a body part (body) in the form of a quadrangular prism, a first insert part (upper shaft) in the form of a solid shaft provided continuously to the body part, and a second insert part (lower shaft) in the form of a hollow shaft (cylindrical shape) provided continuously to the body part. The first insert part and the second insert part each have an outer diameter smaller than the outer diameter of the body part. While the first insert part is inserted through the external terminal, the distal end of the first insert part is swaged. The distal end of the second insert part is swaged while the second insert part is inserted through the partition wall of the case, the internal sealing member, the outer sealing member, and the current collector (see Patent Literature 1, for example).

Thus, the distal end of the first insert part and the distal end of the second insert part of the rivet member each have an expanded diameter. That is, the first insert part in the form of a solid shaft is deformed to have a larger diameter due to its distal end being entirely crushed. On the other hand, the second insert part in the form of a hollow shaft is deformed to have a flange shape due to its distal end being crushed while inclined outwardly in the radial direction. Therefore, the swaged distal ends of the rivet member deform and expand on the conductive members such as the external terminal and the current collector, resulting in an increase in thickness of the external terminal and the current collector. From the viewpoint of the energy density per volume of the electric storage device, it is better for the conductive members to have a smaller apparent thickness.

Further, this problem applies not only to battery cells but also to capacitors (such as electric double layer capacitors).

CITATION LIST

Patent Literature

Patent Literature 1: JP H08-077999 A

SUMMARY

Technical Problem

It is therefore an object of the present invention to provide an electric storage device capable of suppressing an increase in thickness of conductive members, even if a rivet member is swaged, and an electric storage apparatus including the electric storage device.

Solution to Problem

An electric storage device according to the present invention includes: an electrode assembly including a positive electrode plate and a negative electrode plate that are insulated from each other; a case constituted by a partition wall, the case housing the electrode assembly; a rivet member including an insert part provided on one end, the rivet member being fixed to the partition wall; and a conductive member including an insert-receiving part through which the insert part is inserted, the conductive member being electrically connected to the rivet member, wherein the insert part has a higher Vickers hardness than a peripheral region of the insert-receiving part of the conductive member, and the insert part includes, at a distal end of the insert part, a swaged part that is swaged while the insert part is inserted through the conductive member.

BRIEF DESCRIPTION OF DRAWINGS

FIG. 1 is a side view of a battery cell according to a first embodiment of the present invention.

FIG. 3 is an enlarged sectional view of a terminal structure of the battery cell.

FIG. 13 is an enlarged sectional view of a terminal structure of a battery cell according to another embodiment.

FIG. 14 is a sectional view of a main part of the terminal structure before a rivet member and a pulling member are swaged together.

DESCRIPTION OF EMBODIMENTS

Figure 2:
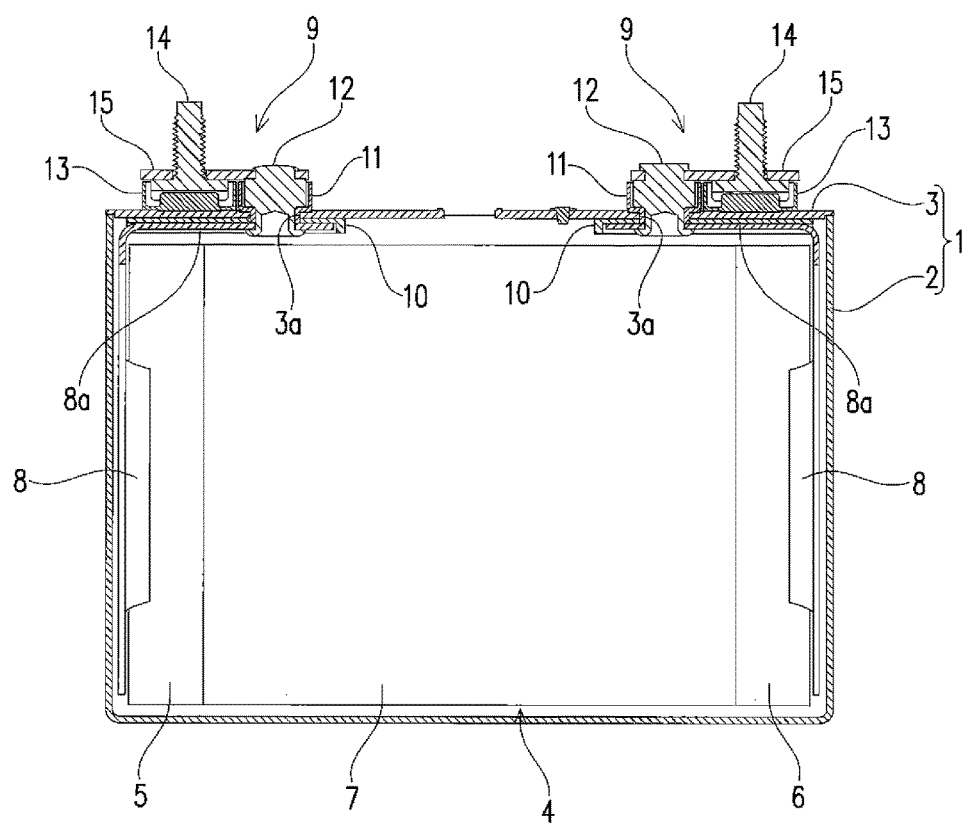
FIG. 2 is a sectional view of the battery cell.

An electric storage device according to this embodiment includes: an electrode assembly including a positive electrode plate and a negative electrode plate that are insulated from each other; a case constituted by a partition wall, the case housing the electrode assembly; a rivet member including an insert part provided on one end, the rivet member being fixed to the partition wall; and a conductive member including an insert-receiving part through which the insert part is inserted, the conductive member being electrically connected to the rivet member, wherein the insert part has a higher Vickers hardness than a peripheral region of the insert-receiving part of the conductive member, and the insert part includes, at a distal end of the insert part, a swaged part that is swaged while the insert part is inserted through the conductive member.

According to such a configuration, the insert part of the rivet member is inserted through the insert-receiving part of the conductive member, and its distal end is swaged, thereby expanding on the conductive member. At this time, the insert part has a higher Vickers hardness than the peripheral region of the insert-receiving part of the conductive member, and therefore the distal end of the insert part compresses and deforms the peripheral region of the insert-receiving part in the thickness direction while expanding on the conductive member. This reduces the thickness of the peripheral region of the insert-receiving part, thereby suppressing an increase in thickness of the conductive member.

According to one aspect, the electric storage device of this embodiment may have a configuration in which the rivet member includes a body part that is joined to the insert part and is in contact with the conductive member, the body part has a larger width dimension in a direction intersecting the insertion direction of the insert part than the insert-receiving part, and the body part has a higher Vickers hardness than a region of the conductive member in contact with the body part.

According to such a configuration, the distal end of the insert part of the rivet member is swaged, while the insert part is inserted through the insert-receiving part of the conductive member and the body part is in contact with the conductive member, thereby allowing the peripheral region of the insert-receiving part of the conductive member to be sandwiched between the distal end and the body part so as to be compressed and deformed from both sides in the thickness direction. This reduces the thickness of the peripheral region of the insert-receiving part, thereby suppressing an increase in thickness of the conductive member.

In this case, the configuration may be such that the body part has a non-circular shape as seen in the center axis direction of the insert-receiving part.

According to such a configuration, in the case where an external force is applied to the conductive member, for example, when the conductive member is fixed to the partition wall, the motion of the conductive member and the rivet member to relatively rotate about the center axis of the insert-receiving part is restricted.

According to another aspect, the electric storage device of this embodiment may have a configuration in which the insert-receiving part has a non-circular shape as seen in the center axis direction of the insert-receiving part.

According to such a configuration, when the distal end of the insert part is swaged while the rivet member is supported by any means such as a tool and a jig, the motion of the conductive member to rotate about the center axis due to the swaging action force on the distal end is restricted. Thus, when the distal end of the insert part of the rivet member is swaged, the relative rotation between the rivet member and the conductive member can be suppressed.

An electric storage device according to another embodiment includes: an electrode assembly including a positive electrode plate and a negative electrode plate that are insulated from each other; a case constituted by a partition wall, the case housing the electrode assembly; a rivet member including an insert part provided on one end and a body part joined to the insert part, the rivet member being fixed to the partition wall; and a conductive member including an insert-receiving part through which the insert part is inserted, the conductive member being electrically connected to the rivet member, wherein the body part is wider in a direction intersecting the insertion direction of the insert part than the insert-receiving part and is in contact with the conductive member, the body part has a higher Vickers hardness than a region of the conductive member in contact with the body part, and the insert part includes, at a distal end of the insert part, a swaged part that is swaged while the insert part is inserted through the conductive member.

According to such a configuration, the distal end of the insert part of the rivet member is swaged, while the insert part is inserted through the insert-receiving part of the conductive member and the body part is in contact with the conductive member, as a result of which the distal end expands on the conductive member. At this time, the body part has a higher Vickers hardness than a region of the conductive member in contact with the body part, and therefore the peripheral region of the insert-receiving part is compressed and deformed in the thickness direction when the conductive member is pressed against the body part by the distal end of the insert part expanding on the conductive member. This reduces the thickness of the peripheral region of the insert-receiving part, thereby suppressing an increase in thickness of the conductive member.

According to another aspect, the electric storage device of this embodiment may have a configuration in which the body part has a non-circular shape as seen in the center axis direction of the insert-receiving part.

According to such a configuration, in the case where an external force is applied to the conductive member, for example, when the conductive member is fixed to the partition wall, the motion of the conductive member and the rivet member to relatively rotate about the center axis of the insert-receiving part is restricted.

An electric storage device according to another embodiment includes: an electrode assembly including a positive electrode plate and a negative electrode plate that are insulated from each other; a case constituted by a partition wall, the case housing the electrode assembly; a rivet member including an insert part provided on one end, the rivet member being fixed to the partition wall; and a conductive member including an insert-receiving part through which the insert part is inserted, the conductive member being electrically connected to the rivet member, wherein the insert part has any one of materials C1100-H, C1020-H, and A6061-T6 that are defined in Japanese Industrial Standards, the insert-receiving part of the conductive member has any one of materials A5052-H34, A1050-H24, A1100-O, A1100-H24, and A3003-H, and annealed material C1100-H that are defined in Japanese Industrial Standards, and the insert part includes, at a distal end of the insert part, a swaged part that is swaged while the insert part is inserted through the conductive member.

According to such a configuration, the insert part of the rivet member is inserted through the insert-receiving part of the conductive member, and its distal end is swaged, thereby expanding on the conductive member. At this time, the material of the insert part is harder than the material of the peripheral region of the insert-receiving part of the conductive member, and therefore the distal end of the insert part compresses and deforms the peripheral region of the insert-receiving part in the thickness direction while expanding on the conductive member. This reduces the thickness of the peripheral region of the insert-receiving part, thereby suppressing an increase in thickness of the conductive member.

According to one aspect, the electric storage device of the other embodiment may have a configuration in which the rivet member includes a body part having a larger width dimension in a direction intersecting the insertion direction of the insert part than the insert-receiving part, the body part being in contact with the conductive member, and the body part has any one of materials C1100-H, C1020-H, and A6061-T6 that are defined in Japanese Industrial Standards.

According to such a configuration, the material of the body part is harder than the material of the portion of the conductive member in contact with the body part. Therefore, the distal end of the insert part of the rivet member is swaged, while the insert part is inserted through the insert-receiving part of the conductive member and the body part is in contact with the conductive member, thereby allowing the peripheral region of the insert-receiving part of the conductive member to be sandwiched between the distal end and the body part so as to be compressed and deformed from both sides in the thickness direction. This reduces the thickness of the peripheral region of the insert-receiving part, thereby suppressing an increase in thickness of the conductive member.

In this case, the configuration may be such that the body part has a non-circular shape as seen in the center axis direction of the insert-receiving part.

According to such a configuration, in the case where an external force is applied to the conductive member, for example, when the conductive member is fixed to the partition wall, the motion of the conductive member and the rivet member to relatively rotate about the center axis of the insert-receiving part is restricted.

According to another aspect, the electric storage device of the other embodiment may have a configuration in which the insert part has a non-circular shape as seen in the center axis direction of the insert-receiving part.

According to such a configuration, when the distal end of the insert part is swaged while the rivet member is supported by any means such as a tool and a jig, the motion of the conductive member to rotate about the center axis due to the swaging action force on the distal end is restricted. Thus, when the distal end of the insert part of the rivet member is swaged, the relative rotation between the rivet member and the conductive member can be suppressed.

An electric storage device according to still another embodiment includes an electrode assembly including a positive electrode plate and a negative electrode plate that are insulated from each other; a case constituted by a partition wall, the case housing the electrode assembly; a rivet member including an insert part provided on one end, the rivet member being fixed to the partition wall; and a conductive member including an insert-receiving part through which the insert part is inserted, the conductive member being electrically connected to the rivet member, wherein the rivet member includes: a body part having a larger width dimension in a direction intersecting the insertion direction of the insert part than the insert-receiving part, the body part being in contact with the conductive member; and a swaged part formed by the distal end of the insert part being swaged while the distal end of the insert part is inserted through the conductive member, the swaged part having a larger width dimension in a direction intersecting the insertion direction of the insert part than the insert-receiving part and sandwiching the conductive member with the body part, the conductive member has a first recess into which at least a part of the swaged part is fitted and a second recess into which a portion of the body part that is in contact with the conductive member is fitted, and the first recess and the second recess are recessed in the insertion direction of the insert part so as to be closer to each other.

According to such a configuration, the thickness of the peripheral region of the insert-receiving part of the conductive member is reduced as compared to the thickness of the other region by the first recess and the second recess. Therefore, when the rivet member is swaged so that the rivet member and the conductive member are connected, that is, when the conductive member is sandwiched by the swaged part and the body part, at least a part of the swaged part is fitted into the first recess, and the portion of the body part in contact with the conductive member is fitted into the second recess. As a result, an increase in thickness of the conductive member is suppressed.

An electric storage apparatus according to this embodiment includes: at least two electric storage devices including at least one electric storage device set forth above; and a bus bar coupling the at least two electric storage devices to each other.

According to such a configuration, in any one of the electric storage devices set forth above, the thickness of the peripheral region of the insert part of the conductive member is smaller than the thickness of the other region of the conductive member, and therefore an increase in thickness of the conductive member, when the rivet member and the conductive member are connected together by swaging the rivet member, is suppressed.

According to one aspect, the electric storage apparatus of this embodiment may have a configuration in which the bus bar is stacked on the conductive member, and the bus bar has an insertion hole larger than the swaged part in a region overlapping the swaged part.

As described above, the electric storage device of this embodiment and the electric storage apparatus including the electric storage device can suppress an increase in thickness of the conductive member due to the rivet member being swaged.

Hereinafter, a battery cell as an embodiment of an electric storage device according to the present invention is described with reference to the drawings. The battery cell according to this embodiment is a non-aqueous electrolyte secondary battery cell, more specifically, a lithium ion secondary battery cell. The battery cell according to this embodiment includes a case 1 having a case body 2 and a cover plate 3 that closes and seals the opening of the case body 2, as shown in FIG. 1 to FIG. 5B. Further, terminal structures 9 electrically connected to an electrode assembly 4 housed in the case 1 are provided on the cover plate 3.

The case body 2 and the cover plate 3 are made of metals such as aluminum alloy and stainless steel alloy. The case body 2 and the cover plate 3 of this embodiment are made of aluminum alloy. The case body 2 has a bottomed rectangular cylindrical shape flattened in the width direction (the horizontal direction in FIG. 1) so as to be capable of housing the elongated cylindrical electrode assembly 4 of a wound type. The cover plate 3 is a rectangular plate member corresponding to the opening of the case body 2.

As shown in FIG. 1 and FIG. 2, two through holes 3a through which rivet members 12, which will be described below, are inserted are formed in the cover plate 3 at intervals in the longitudinal direction of the cover plate 3. The cover plate 3 is fitted into the opening of the case body 2, and is fixed to the case body 2 by laser welding or the like while the case body 2 and the cover plate 3 are sealed together.

As shown in FIG. 2, the electrode assembly 4 is formed by winding a strip-shaped negative electrode sheet 5 and a strip-shaped positive electrode sheet 6 that are shifted in different directions on the left and right with a strip-shaped separator 7 interposed between the negative electrode sheet 5 and the positive electrode sheet 6 into an elongated cylindrical shape forming a vertically elongated circle about a rotation axis extending in the horizontal direction at the center. The electrode assembly 4 is housed within the case 1 while the whole thereof is covered by an insulating cover formed using an insulating sheet so as to be insulated from the case 1. The negative electrode sheet 5 is formed by allowing a copper foil to carry a negative electrode active material on its surface. The positive electrode sheet 6 is formed by allowing an aluminum foil to carry a positive electrode active material on its surface. The negative electrode sheet 5 and the positive electrode sheet 6 have portions without such active material coating on their respective edges in the shifted directions. Therefore, the aluminum foil and the copper foil are exposed on the left and right ends of the electrode assembly 4, and these electrode metal foils are protruding while they are wound in the form of a wound bundle.

Further, current collectors 8 are electrically connected respectively to the metal foils protruding on the left and right ends of the electrode assembly 4. Each current collector 8 is a metal member that is vertically elongated and is electrically conductive. More specifically, a positive electrode current collector 8 is made of aluminum or aluminum alloy, and a negative electrode current collector 8 is made of copper or copper alloy. The upper part of the current collector 8 is bent in the horizontal direction so as to form a connector 8a. The portion of the current collector 8 below the connector 8a is bifurcated forward and backward and projects downwardly. This bifurcated portion is sandwiched by clip plates together with an end of the electrode assembly 4, and is connected and fixed to the electrode assembly 4 by ultrasonic welding or the like.

The battery cell includes a positive electrode terminal structure 9 and a negative electrode terminal structure 9. As shown in detail in FIG. 3 and FIG. 4, each terminal structure 9 includes a resin plate 10 and an outer gasket 11, a rivet member 12, a terminal anti-rotation member 13, a terminal bolt 14, and a pulling member 15. The resin plate 10 and the outer gasket 11 are arranged so as to sandwich each of the through holes 3a that are formed on the left and right ends of the cover plate 3 from the inner and outer sides. The rivet member 12 is inserted through the through hole 3a via the resin plate 10 and the outer gasket 11, and is electrically connected to the connector 8a of the current collector 8. The terminal anti-rotation member 13 is arranged adjacent to the outer gasket 11. The terminal bolt 14 is arranged on the outer surface of the cover plate 3 via the terminal anti-rotation member 13. The pulling member 15 electrically connects the terminal bolt 14 and the rivet member 12 to each other. With such a configuration, the electrode assembly 4 within the case 1 and the terminal bolt 14 are electrically connected together.

The resin plate 10 is a synthetic resin member having insulating properties and sealing properties. More specifically, the resin plate 10 is, for example, made of polyphenylene sulfide (PPS) resin. However, the material of the resin plate 10 is not limited to PPS, and can be appropriately selected. The resin plate 10 has a rectangular shape. A recess 10a capable of receiving the connector 8a of the current collector 8 is formed on the lower surface of the resin plate 10. The resin plate 10 has a through hole 10b coinciding with a through hole 8b formed through the connector 8a when the connector 8a of the current collector 8 is received in the recess 10a.

The outer gasket 11 is a synthetic resin member having insulating properties and sealing properties. More specifically, the outer gasket 11 is, for example, made of polyphenylene sulfide (PPS) resin. However, the material of the outer gasket 11 is not limited to PPS and can be appropriately selected.

The outer gasket 11 has a rectangular shape with a size larger than a body part 12a of the rivet member 12. In the outer gasket 11, a round outer wall 11a is provided on the outer circumferential edge by recessing the upper surface excluding the outer circumferential portion. The outer gasket 11 includes a recess 11b capable of receiving the body part 12a of the rivet member 12 within the outer wall 11a. The outer gasket 11 has a through hole 11c through which a first swaged part 12b of the rivet member 12 can be inserted when the body part 12a of the rivet member 12 is received in the recess 11b. An annular projection 11d inserted through the through hole 3a of the cover plate 3 and inserted into the through hole 10b of the resin plate 10 is formed on the lower surface of the outer gasket 11.

The resin plate 10 is arranged on the lower surface (inner surface) of the cover plate 3, as a result of which it is arranged within the case 1. The outer gasket 11 is arranged on the upper surface (outer surface) of the cover plate 3, as a result of which it is arranged on the outer surface of the case 1. On the upper surface of the cover plate 3 in the region where the outer gasket 11 is arranged, a non-circular recess 3b capable of receiving the lower part (bridge part) of the outer gasket 11 is formed. The lower part (joint surface with the cover plate 3) of the outer gasket 11 is inserted (fitted) into the recess 3b, thereby restricting the rotation of the outer gasket 11 about the axis of the through hole 3a. The recess 3b of this embodiment is formed into a rectangular shape corresponding to the shape of the lower part of the rectangular outer gasket 11. Further, the recess 3b is formed, for example, by coining.

Figure 4:
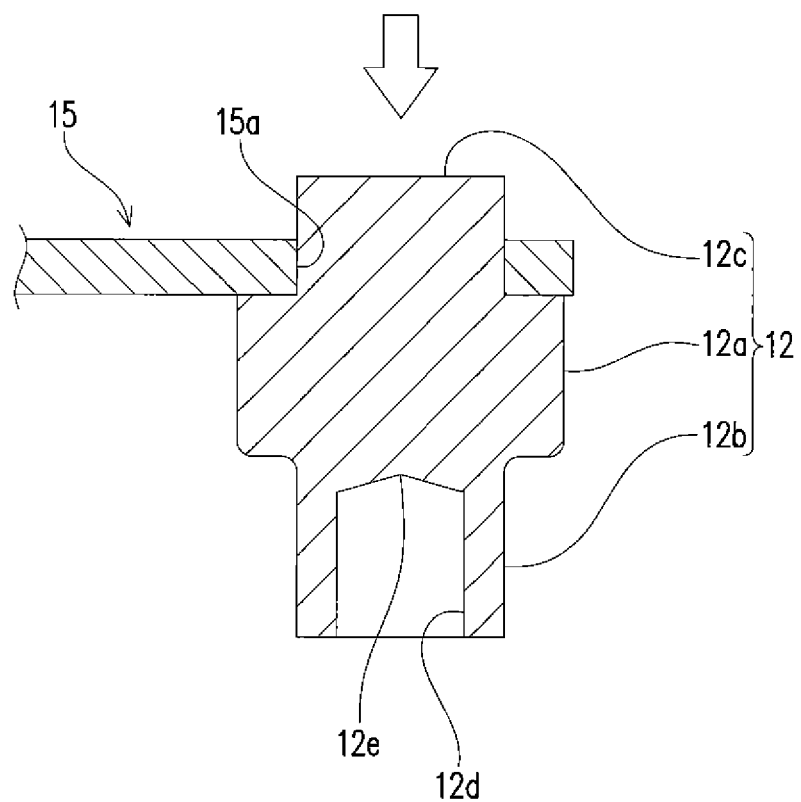
FIG. 4 is a sectional view of a main part of the terminal structure before a rivet member and a pulling member are swaged together.

The battery cell has a positive electrode rivet member 12 and a negative electrode rivet member 12. The positive electrode rivet member 12 is a conductive metal member made of aluminum alloy (specifically, A5052-H34 defined in JIS: Japanese Industrial Standards) or the like. The negative electrode rivet member 12 is a conductive metal member made of copper alloy (specifically, C1100-H defined in JIS) or the like. As shown in FIG. 3 and FIG. 4, the first swaged part 12b is provided protruding downward from the lower surface of the body part 12a. A second swaged part 12c is provided as an insert part protruding upward from the upper surface of the body part 12a. The first swaged part 12b and the second swaged part 12c both have a shaft-like appearance. The first swaged part 12b and the second swaged part 12c both have a smaller diameter than the body part 12a.

Here, the above-described A5052-H34 is an Al—Mg based aluminum alloy. The A5052-H34 is obtained by stabilizing the aluminum alloy (A5052) shown in Table 1 below after cold working. The mechanical properties of the A5052-H34 are as shown in Table 2 below. The alphabet "P" shown in the column of DESIGNATION of Table 2 after the A5052 is a symbol indicating that a test piece has a plate shape.

TABLE 1

CHEMICAL COMPOSITIONS

| ALLOY No. | CLADDING MATERIAL | Si | Fe | Cu | Mn | Mg | Cr | Zn | Ca, V | Ti | Zr, Zr + Ti, OTHERS INDIVIDUAL | TOTAL | Al |
|---|---|---|---|---|---|---|---|---|---|---|---|---|---|
| A 5052 | — | Not more than 0.25 | Not more than 0.40 | Not more than 0.10 | Not more than 0.10 | 2.2-2.8 | 0.15-0.35 | Not more than 0.10 | — | — | Not more than 0.05 | Not more than 0.15 | RESIDUAL |

UNIT: %

TABLE 2

MECHANICAL PROPERTIES

| | | TENSILE TEST | | | | BENDING TEST | |
|---|---|---|---|---|---|---|---|
| DESIGNATION | TEMPER | THICKNESS mm | TENSIL STRENGTH N/mm² | YIELD STRENGTH N/mm² | ELONGATION % | THICKNESS mm | INSIDE RADIUS |
| A 5052P | H34 | At least 0.2 and not more than 0.5 | | | At least 3 | | |
| | | More than 0.5 and not more than 0.8 | | | At least 4 | At least 0.2 and not more than 0.8 | The same as the thickness |
| | | More than 0.8 and not more than 1.3 | At least 235 | At least 175 | At least 4 | More than 0.8 and not more than 2.9 | 1.5 times the thickness |
| | | More than 1.3 and not more than 2.9 | Not more than 285 | At least 175 | At least 6 | More than 2.9 and not more than 6 | 2 times the thickness |
| | | More than 2.9 and not more than 6.5 | | At least 175 | At least 7 | | |
| | | More than 6.5 and not more than 12 | | At least 175 | At least 10 | | |

Further, the above-described C1100-H is so-called tough pitch copper. The C1100-H is obtained by work hardening of the tough pitch copper (C1100) shown in Table 3 below. The mechanical properties of the C1100-H are as shown in Table 4 below. The alphabet "P" shown in the column of DESIGNATION of Table 4 after the C1100 is a symbol indicating that a test piece has a plate shape.

TABLE 3

CHEMICAL COMPOSITIONS

| ALLOY No. | CHEMICAL COMPOSITION | | | | | | | | | |
|---|---|---|---|---|---|---|---|---|---|---|
| | Cu | Pb | Fe | Sn | Zn | Al | Mn | Ni | P | OTHERS |
| C 1100 | At least 99.90 | — | — | — | — | — | — | — | — | — |

UNIT: %

TABLE 4

MECHANICAL PROPERTIES

| | | | TENSILE TEST | | | BENDING TEST | | | HARDNESS TEST | |
|---|---|---|---|---|---|---|---|---|---|---|
| ALLOY No. | TEMPER | DESIGNATION | THICKNESS mm | TENSIL STRENGTH N/mm² | ELONGATION % | THICKNESS mm | BENDING ANGLE | INSIDE RADIUS | THICKNESS mm | VICKERS HARDNESS HV |
| | H | C 1100 P-H | At least 0.15 and less than 0.5 At least 0.5 and not more than 10 | At least 275 | — | Not more than 2 | 180° | 1.5 times the thickness | At least 0.3 | At least 80 |

The body part 12a is in the form of a shaft. The body part 12a has an outer diameter larger than the hole diameter of the through hole 3a of the cover plate 3. The body part 12a includes four flat portions (not numbered) that are arranged on its outer circumference at equal intervals in the circumferential direction. The four flat portions each face the inner surface of the outer wall 11a of the outer gasket 11 when the body part 12a is received in the recess 11b of the outer gasket 11.

The first swaged part 12b is a portion that is inserted through the through hole 3a of the cover plate 3, the through hole 8b of the connector 8a of the current collector 8, the through hole 10b of the resin plate 10, and the through hole 11c of the outer gasket 11. The first swaged part 12b is inserted from the outer side to the inner side of the cover plate 3, that is, in a direction from the cover plate 3 toward the current collector 8. In this embodiment, the annular projection 11d of the outer gasket 11 is inserted through the through hole 3a of the cover plate 3 and the through hole 10b of the resin plate 10. Therefore, the first swaged part 12b is also inserted through the through hole 3a of the cover plate 3 and the through hole 10b of the resin plate 10 by being inserted through the through hole 11c of the outer gasket 11.

The first swaged part 12b has a length such that its distal end projects from the inner surface of the resin plate 10 toward the inside of the case 1 when it is inserted through the through hole 3a of the cover plate 3, the through hole 10b of the resin plate 10, the through hole 11c of the outer gasket 11, and the through hole 8b of the current collector 8.

A non-through hole 12d extending in the axial direction is formed at the distal end of the first swaged part 12b. Thus, the distal end of the first swaged part 12b is in the form of a hollow shaft, as shown in FIG. 3.

The non-through hole 12d is formed, for example, using a drill. Therefore, a bottom 12e of the non-through hole 12d is tapered corresponding to the shape of the tip of the drill.

The distal end of the first swaged part 12b is swaged to be crushed while being inclined outwardly in the radial direction, so as to have a flange shape with a larger diameter than the proximal end of the first swaged part 12b. That is, the first swaged part 12b has a larger diameter than the through hole 3a of the cover plate 3 due to its distal end being swaged.

As a result, the body part 12a and the distal end of the first swaged part 12b having a flange shape sandwich the periphery of the through holes 3a, 8b, 10b, and 11c, while allowing the outer gasket 11 to be in tight contact with the outer surface of the cover plate 3 and allowing the resin plate 10 to be in tight contact with the inner surface of the cover plate 3. As a result, the circumference of the through holes 3a, 8b, 10b, and 11c is sealed, so that the inside of the case 1 is kept air tight. The first swaged part 12b is swaged before the cover plate 3 is welded to the case body 2.

As shown in FIG. 3 and FIG. 4, the second swaged part 12c is in the form of a solid shaft with a smaller diameter than the body part 12a. The second swaged part 12c has a shaft diameter such that it can be inserted into a first through hole 15a, which will be described below, formed in the pulling member 15. Then, the distal end of the second swaged part 12c is swaged while the second swaged part 12c is inserted through a first through hole 15b of the pulling member 15. Thus, the pulling member 15 is sandwiched by the body part 12a and the distal end of the second swaged part 12c deformed into a flange shape, so as to be physically and electrically connected to the rivet member 12. The second swaged part 12c is swaged in advance before the first swaged part 12b is swaged.

Here, the dimensional relationship of the through hole 3a of the cover plate 3, the through hole 8b of the connector 8a of the current collector 8, the through hole 10b of the resin plate 10, the through hole 11c of the outer gasket 11, the annular projection 11d of the outer gasket 11, and the first swaged part 12b of the rivet member 12 is described. As shown in detail in FIG. 3, the inner diameter of the through hole 3a of the cover plate 3 and the inner diameter of the through hole 10b of the resin plate 10 are equal or substantially equal to each other. Further, the inner diameter of the through hole 3a of the cover plate 3, the inner diameter of the through hole 10b of the resin plate 10, and the outer diameter of the annular projection 11d of the outer gasket 11 are equal or substantially equal to each other. Further, the length of the annular projection 11d of the outer gasket 11 and the total thickness of the cover plate 3 and the resin plate 10 are equal or substantially equal to each other. Further, the inner diameter of the annular projection 11d of the outer gasket 11 and the inner diameter of the through hole 8b of the connector 8a of the current collector 8 are equal or substantially equal to each other. Further, the inner diameter of the annular projection 11d of the outer gasket 11, the diameter of the through hole 8b of the connector 8a of the current collector 8, and the outer diameter of the first swaged part 12b of the rivet member 12 are equal or substantially equal to each other.

The body part 12a of the rivet member 12 is inserted into the recess 11b of the outer gasket 11, thereby allowing the first swaged part 12b of the rivet member 12 to be inserted through the through hole 8b of the connector 8a of the current collector 8 passing through the through hole 11c at the bottom of the recess 11b. The distal portion of the first swaged part 12b projecting downward from the through hole 8b of the connector 8a is swaged from below. Thus, the rivet member 12 is attached to the cover plate 3 while being electrically connected to the connector 8a of the current collector 8 and being insulated from the cover plate 3.

The terminal bolt 14 serves to electrically connect the battery cell to an external device. The terminal bolt 14 is a conductive metal member with high strength that is formed using iron, steel such as stainless steel and chromium molybdenum steel, or the like.

A positive electrode pulling member 15 and a negative electrode pulling member 15 are both a conductive metal member having a rectangular shape that is formed using aluminum alloy (specifically, A5052-H34 defined in JIS). The first through hole 15a is formed on one end in the longitudinal direction of the pulling member 15. A second through hole 15b is formed on the other end in the longitudinal direction of the pulling member 15. The second swaged part 12c of the rivet member 12 is inserted through the first through hole 15a in both of the positive electrode pulling member 15 and the negative electrode pulling member 15. Further, the shaft of the terminal bolt 14 is inserted through the second through hole 15b in both of the positive electrode pulling member 15 and the negative electrode pulling member 15. Furthermore, the distal portion of the second swaged part 12c of the rivet member 12 projecting upward from the first through hole 15a of the pulling member 15 is swaged from above. This allows the rivet member 12 and the pulling member 15 to be integrated together.

In this embodiment, the second swaged part 12c of the rivet member 12 serving as an insert part is inserted through the first through hole 15a (insert-receiving part) of the pulling member 15 serving as a conductive member, and the distal end of the second swaged part 12c is swaged to expand on the pulling member 15. The Vickers hardness of the second swaged part 12c is higher than the Vickers hardness of the peripheral region of the first through hole 15a of the pulling member 15 that is in contact with the body part 12a. Therefore, while the distal end of the second swaged part 12c expands on the pulling member 15, the peripheral region of the first through hole 15a is compressed and deformed in the thickness direction. This reduces the thickness of the peripheral region of the first through hole 15a, thereby suppressing an increase in thickness of the pulling member 15.

Further, the second swaged part 12c of the rivet member 12 is inserted through the first through hole 15a of the pulling member 15, and the distal end of the second swaged part 12c is swaged, thereby allowing the peripheral region of the first through hole 15a of the pulling member 15 to be sandwiched by the body part 12a and the swaged distal end of the second swaged part 12c. Thus, the peripheral region of the first through hole 15a of the pulling member 15 is compressed and deformed from both sides in the thickness direction, and the thickness of the peripheral region of the first through hole 15a of the pulling member 15 is reduced. As a result, an increase in thickness of the pulling member 15 is suppressed.

Further, the peripheral region of the first through hole 15a of the pulling member 15 is compressed and deformed from both sides in the thickness direction due to the distal end of the second swaged part 12c being swaged, as a result of which a recess (first recess) into which a part of the second swaged part 12c is fitted and a recess (second recess) into which a part of the body part 12a is fitted are formed in the pulling member 15. The first recess and the second recess are recessed in the insertion direction of the second swaged part 12c (insertion part) of the rivet member 12 so as to be closer to each other.

Figure 5A:
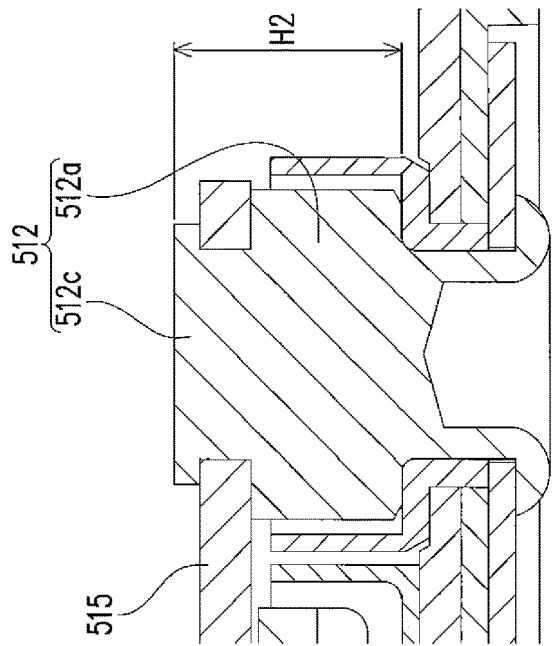
FIG. 5A is an enlarged sectional view of the terminal structure for explaining the height of the rivet member after swaging in this embodiment.
Figure 5B:
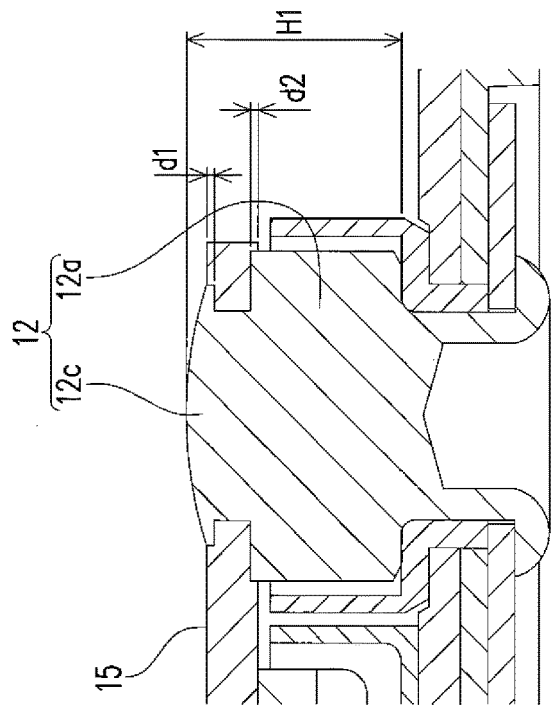
FIG. 5B is an enlarged sectional view of a terminal structure for explaining the height of a rivet member after swaging in a conventional art.

Here, the thickness of the rivet member 12 after swaging is described with reference to FIG. 5A and FIG. 5B. The thickness of the rivet member 12 of this embodiment before swaging is the same as the thickness of a rivet member 512 of the conventional art before swaging. The thickness of the rivet member 12 of this embodiment after swaging is defined as length H1 from the bottom of the body part 12a of the rivet member 12 to the top of the second swaged part 12c. Further, the thickness of the rivet member 512 of the conventional art after swaging is defined as length H2 from the bottom of a body part 512a of the rivet member 512 to the top of a second swaged part 512c. At this time, the thickness H1 of the rivet member 12 of this embodiment is smaller than the thickness H2 of the rivet member 512 of the conventional art. Specifically, the thickness H1 of the rivet member 12 of this embodiment is smaller than the thickness H2 of the rivet member 512 of the conventional art, by the total length (d1+d2) of a thickness d1 with which the pulling member 15 is compressed and deformed by the second swaged part 12c of the rivet member 12 and a thickness d2 with which the pulling member 15 is compressed and deformed by the body part 12a. That is, the difference between the thickness H1 of the rivet member 12 of this embodiment and the thickness H2 of the rivet member 512 of the conventional art is: H2−H1=d1+d2. Therefore, the rivet member 12 of this embodiment can reduce the thickness of the rivet member 12. That is, an increase in thickness of the rivet member 12 is suppressed. Further, the thickness of the pulling member 15 is reduced only in the region in which the pulling member 15 is compressed and deformed by the body part 12a or the second swaged part 12c of the rivet member 12. Therefore, only the thickness of the rivet member 12 as a whole is reduced in the rivet member 12. Therefore, the cross sectional area of the rivet member 12 that is necessary as a current path can be secured.

The Vickers hardness can be obtained by measurement based on JIS Z 2244:2009. Specifically, an indenter of quadrangular pyramid made of diamond is pressed against the surface of a test piece to produce an impression, and the surface area of the impression is determined by measuring the diagonal line of the impression. Then, the Vickers hardness can be determined by dividing the force pressing the indenter by the surface area of the impression. In this embodiment, the Vickers hardness of the second swaged part 12c, the body part 12a, and the peripheral region of the first through hole 15a of the pulling member 15 that is in contact with the body part 12a is 110 HV, 110 HV, and 80 HV, respectively. Accordingly, the Vickers hardness of the second swaged part 12c is higher than the Vickers hardness of the peripheral region of the first through hole 15a that is in contact with the body part 12a. Further, the Vickers hardness of the body part 12a is higher than the Vickers hardness of the peripheral region of the first through hole 15a of the pulling member 15 that is in contact with the body part 12a.

Further, the body part 12a of the rivet member 12 has a non-circular shape as seen in the center axis direction of the first through hole 15a of the pulling member 15. The rivet member 12 and the pulling member 15 are integrated together while the peripheral region of the first through hole 15a of the pulling member 15 is compressed and deformed by the non-circular body part 12a. Therefore, in the case where an external force is applied to the pulling member 15, for example, when the rivet member 12 integrated with the pulling member 15 is fixed to a partition wall by swaging the first swaged part 12b, the motion of the pulling member 15 and the rivet member 12 to relatively rotate about the center axis of the first through hole 15a is restricted.

Next, a battery cell as a second embodiment of the electric storage device according to the present invention is described with reference to the drawings. In the battery cell according to this embodiment, the rivet member 12 that corresponds to the negative electrode rivet member in the first embodiment has the body part 12a and the first swaged part 12b. The first swaged part 12b is inserted through the cover plate 3 from the inside toward the outside of the case 1. The distal end of the first swaged part 12b located outside the case 1 is swaged.

Figure 6:
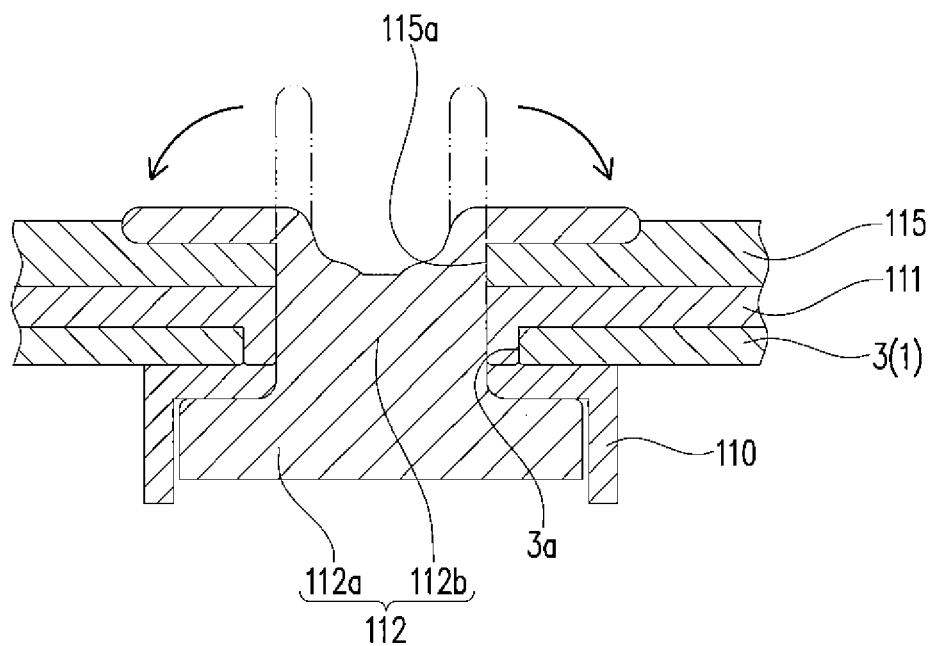
FIG. 6 is an enlarged sectional view of a terminal structure of a battery cell according to a second embodiment of the present invention.

FIG. 6 shows a specific example thereof. A terminal structure 109 includes a rivet member 112 inserted through the cover plate 3 from the inside toward the outside of the case 1. The rivet member 112 includes a body part 112a that is electrically connected to the electrode assembly 4 and an insert part 112b that is provided continuously to the body part 112a and is inserted through the through hole 3a of the cover plate 3. A resin plate 110 is arranged on the inner surface of the cover plate 3, and an outer gasket 111 is arranged on the outer surface of the cover plate 3. Further, a pulling member 115 serving as a conductive member is arranged on the outer surface of the outer gasket 111. The insert part 112b of the rivet member 112 is inserted through the resin plate 110, the cover plate 3, the outer gasket 111, and a first through hole 115a of the pulling member 115 in this order. Then, the distal end of the insert part 112b projecting from the pulling member 115 is swaged.

A negative electrode rivet member 112 is a conductive metal member formed using copper alloy (specifically, C1100-H defined in JIS). The pulling member 115 is a conductive metal member having a rectangular shape formed using aluminum alloy (specifically, A5052-H34 defined in JIS). In this embodiment, the Vickers hardness of the insert part 112b and the peripheral region of the first through hole 115a of the pulling member 115 is 110 HV and 80 HV, respectively.

In this embodiment, the insert part 112b of the negative electrode rivet member 112 is inserted through the first through hole 115a of the pulling member 115. The distal end of the insert part 112b is swaged, thereby expanding on the pulling member 115. However, the Vickers hardness of the insert part 112b is higher than the Vickers hardness of the peripheral region of the first through hole 115a of the pulling member 115. Therefore, while the distal end of the insert part 112b expands on the pulling member 115, the peripheral region of the first through hole 115a of the pulling member 115 is compressed and deformed in the thickness direction, resulting in a reduction in thickness of the peripheral region of the first through hole 115a. Thus, an increase in thickness of the pulling member 115 is suppressed.

Next, a battery cell as a third embodiment of the electric storage device according to the present invention is described with reference to the drawings. In the above-described embodiments, examples of screwing-type terminal structures in which an external device and the battery cell are electrically connected to each other by securing a crimping terminal of a lead wire of the external device to a terminal bolt have been described. The battery cell according to this embodiment has a terminal structure 209 that is a welding-type terminal structure in which the battery cell is connected to another battery cell by welding a bus bar 214 (see FIG. 11) to an external terminal 213.

Figure 7:
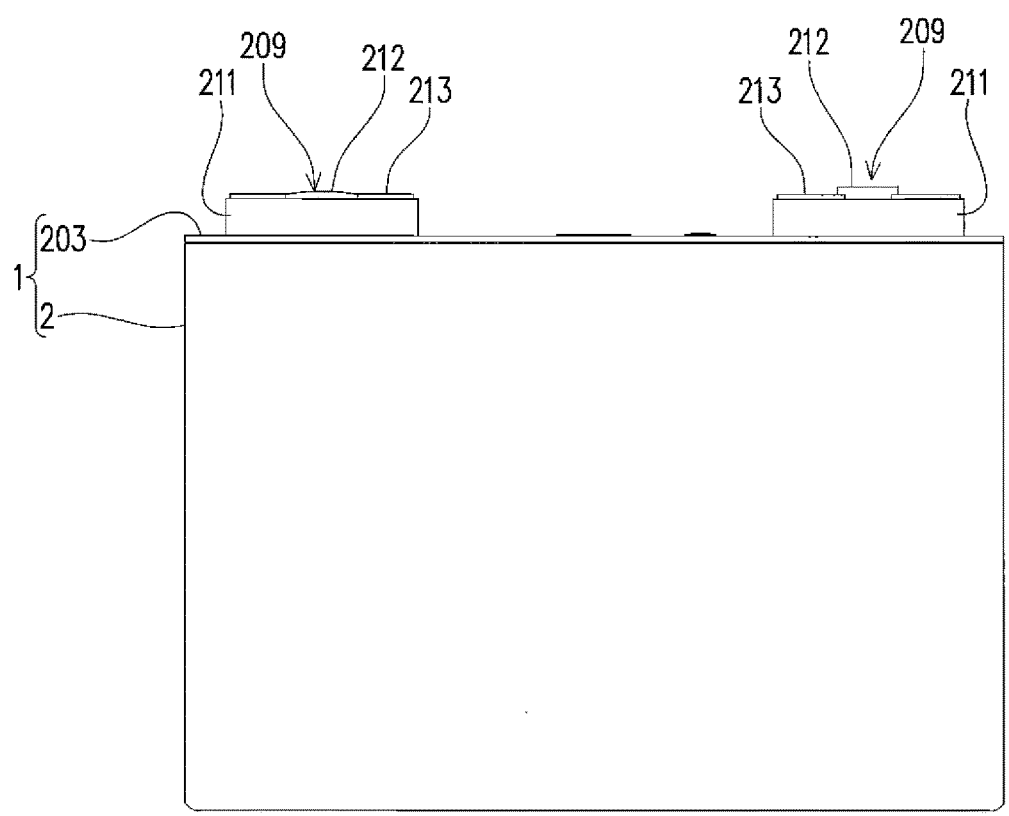
FIG. 7 is a side view of a battery cell according to a third embodiment of the present invention.
Figure 8:
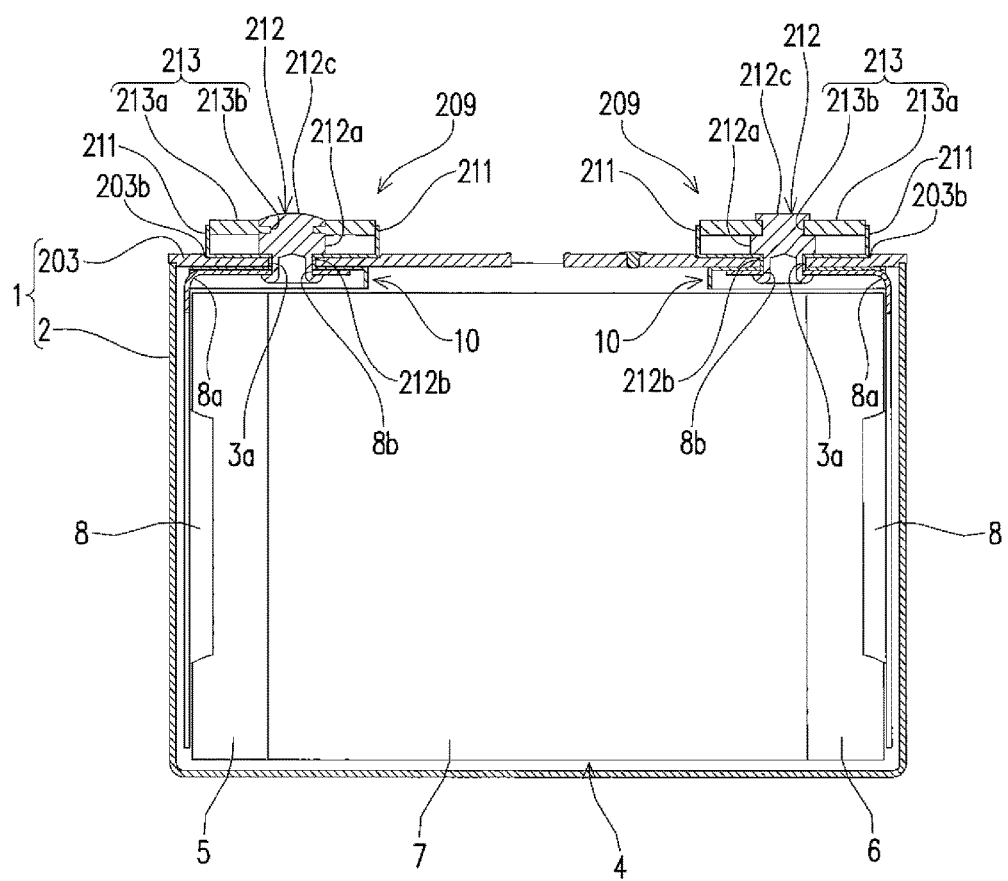
FIG. 8 is a sectional view of the battery cell.
Figure 9:
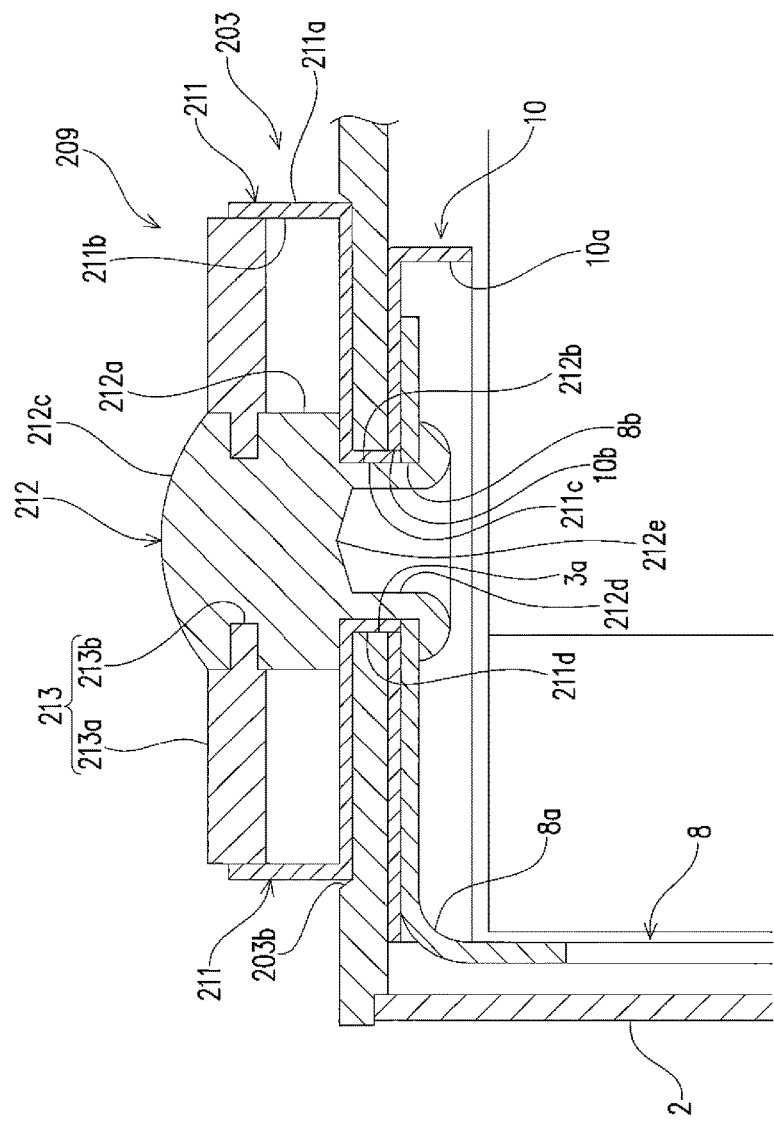
FIG. 9 is an enlarged sectional view of a terminal structure of the battery cell.

The battery cell of this embodiment includes a positive electrode terminal structure 209 and a negative electrode terminal structure 209. As shown in FIG. 7 to FIG. 9, each terminal structure 209 includes the resin plate 10 and an outer gasket (gasket) 211, a rivet member 212, and an external terminal 213. The resin plate 10 and the outer gasket 211 are arranged so as to sandwich the corresponding one of the through holes 3a that are formed respectively on the left and right ends of a cover plate 203 from the inside and outside. The rivet member 212 is inserted through the through hole 3a via the resin plate 10 and the outer gasket 211, and is electrically connected to the connector 8a of the current collector 8 within the case 1. The external terminal 213 is arranged on the outer surface of the cover plate 203, and is electrically connected to the rivet member 212. These allow the electrode assembly 4 and the external terminal 213 within the case 1 to be electrically connected to each other. The external terminal 213 corresponds to the conductive member.

The resin plate 10 is a synthetic resin member having insulating properties and sealing properties. More specifically, the resin plate 10 is, for example, made of polyphenylene sulfide (PPS) resin. However, the material of the resin plate 10 is not limited to PPS, and can be appropriately selected. The resin plate 10 has a rectangular shape. A recess 10a capable of receiving the connector 8a of the current collector 8 is formed on the lower surface of the resin plate 10. The resin plate 10 has the through hole 10b. The through hole 10b coincides (overlaps) with the through hole 8b formed in the connector 8a when the connector 8a of the current collector 8 is received in the recess 10a.

The outer gasket 211 is a synthetic resin member having insulating properties and sealing properties. More specifically, the outer gasket 211 is, for example, made of polyphenylene sulfide (PPS) resin. However, the material of the outer gasket 211 is not limited to PPS and can be appropriately selected.

The outer gasket 211 has a rectangular shape with a size larger than the external terminal 213. In the outer gasket 211, a round outer wall 211a is formed on the outer circumferential edge by recessing the upper surface excluding the outer circumferential portion. The outer gasket 211 includes a recess 211b capable of receiving a body part 212a of the rivet member 212 within the outer wall 211a. The outer gasket 211 has a through hole 211c through which a first swaged part 212b of the rivet member 212 can be inserted when the body part 212a of the rivet member 212 is received in the recess 211b. An annular projection 211d that is inserted through the through hole 3a of the cover plate 203 and is inserted into the through hole 10b of the resin plate 10 is formed on the lower surface of the outer gasket 211.

The resin plate 10 is arranged on the lower surface (inner surface) of the cover plate 203, as a result of which it is arranged within the case 1. The outer gasket 211 is arranged on the upper surface (outer surface) of the cover plate 203, as a result of which it is arranged on the outer surface of the case 1. On the upper surface of the cover plate 203 in the region where the outer gasket 211 is arranged, a non-circular recess 203b capable of receiving the lower part (bridge part) of the outer gasket 211 is formed. The lower part (joint surface with the cover plate 203) of the outer gasket 211 is inserted (fitted) into the recess 203b, thereby restricting the rotation of the outer gasket 211 about the axis. In this embodiment, the recess 203b is formed to have a rectangular shape corresponding to the shape of the lower part of the rectangular outer gasket 211. Further, the recess 203b is formed, for example, by coining.

As shown in FIG. 7 and FIG. 8, the battery cell includes a positive electrode rivet member 212 and a negative electrode rivet member 212. The positive electrode rivet member 212 is a conductive metal member formed using aluminum or aluminum alloy (specifically, A5052-H34 defined by JIS). The negative electrode rivet member 212 is a conductive metal member formed using copper or copper alloy (specifically, C1100-H defined by JIS). As shown in FIG. 8 and FIG. 9, the rivet member 212 includes the body part 212a that is in contact with the external terminal 213 and has a larger width than a through hole 213b, which will be described below, provided in the external terminal 213. The body part 212a has a non-circular shape as seen in the center axis direction of the through hole 213b. The first swaged part 212b is provided protruding downward from the lower surface of the body part 212a. A second swaged part 212c is provided as an insert part protruding upward from the upper surface of the body part 212a. The first swaged part 212b and the second swaged part 212c both have a shaft-like appearance with a smaller diameter than the body part 212a.

The body part 212a is in the form of a shaft. The body part 212a has an outer diameter larger than the hole diameter of the through hole 3a of the cover plate 203. The body part 212a includes four flat portions that are arranged on its outer circumference at equal intervals in the circumferential direction. The four flat portions each have a surface facing the inner surface of the outer wall 211a of the outer gasket 211 surface to surface when the body part 212a is received in the recess 211b of the outer gasket 211.

The first swaged part 212b is a portion that is inserted through the through hole 3a of the cover plate 203, the through hole 8b of the connector 8a of the current collector 8, the through hole 10b of the resin plate 10, and the through hole 211c of the outer gasket 211. The first swaged part 212b is inserted from the outer side to the inner side of the cover plate 203, that is, in a direction from the cover plate 203 toward the current collector 8. In this embodiment, the annular projection 211*d* of the outer gasket 211 is inserted through the through hole 3*a* of the cover plate 203 and the through hole 10*b* of the resin plate 10. Therefore, the first swaged part 212*b* is also inserted through the through hole 3*a* of the cover plate 203 and the through hole 10*b* of the resin plate 10 by being inserted through the through hole 211*c* of the outer gasket 211.

The first swaged part 212*b* has a length such that its distal end projects from the inner surface of the resin plate 10 toward the inside of the case 1 when it is inserted through the through hole 3*a* of the cover plate 203, the through hole 10*b* of the resin plate 10, the through hole 211*c* of the outer gasket 211, and the through hole 8*b* of the current collector 8.

A non-through hole 212*d* extending in the axial direction of the first swaged part 212*b* is formed at the distal end of the first swaged part 212*b*. Thus, the distal end of the first swaged part 212*b* is in the form of a hollow shaft, as shown in FIG. 9.

The non-through hole 212*d* is formed, for example, using a drill. Therefore, a bottom 212*e* of the non-through hole 212*d* is tapered corresponding to the shape of the tip of the drill.

The distal end of the first swaged part 212*b* is swaged to be crushed while being inclined outwardly in the radial direction, and thus has a flange shape with a larger diameter than the proximal end (portion in the vicinity of the body part 212*a*) of the first swaged part 212*b*. That is, the distal end of the first swaged part 212*b* is swaged, thereby having a larger diameter than the through hole 3*a* of the cover plate 203.

As a result, the body part 212*a* and the distal end of the first swaged part 212*b* having a flange shape sandwich the periphery of the through holes 3*a*, 8*b*, 10*b*, and 211*c*, while allowing the outer gasket 211 to be in tight contact with the outer surface of the cover plate 203 and allowing the resin plate 10 to be in tight contact with the inner surface of the cover plate 203. Thus, the circumference of the through holes 3*a*, 8*b*, 10*b*, and 211*c* is sealed, so that the inside of the case 1 is kept air tight. The first swaged part 212*b* is swaged at a stage before the cover plate 203 is welded to the case body 2.

Figure 10:
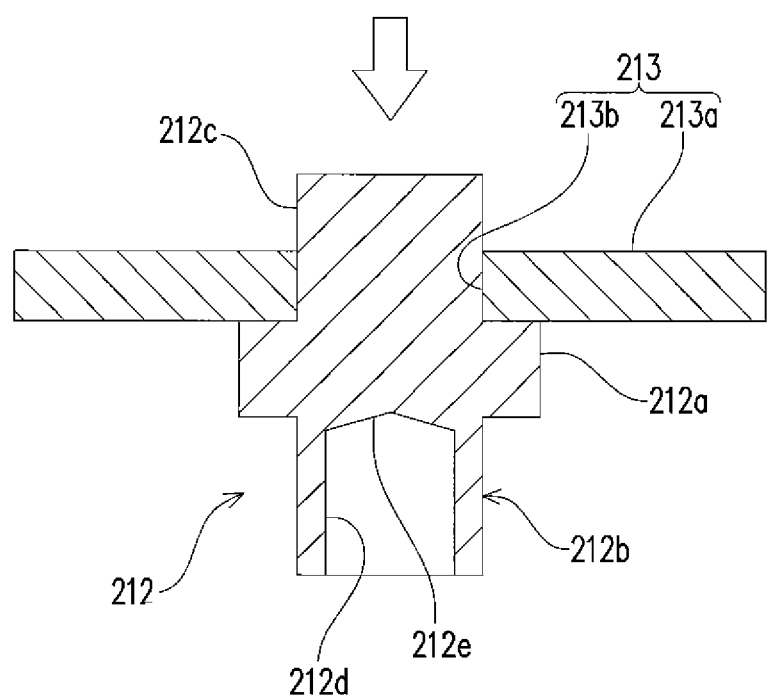
FIG. 10 is a sectional view of a main part of the terminal structure before a rivet member and an external terminal are swaged together.

As shown in FIG. 8 to FIG. 10, the second swaged part 212*c* is in the form of a solid shaft with a smaller diameter than the body part 212*a*. The second swaged part 212*c* has a shaft diameter such that it can be inserted into the through hole 213*b*. Then, the distal end of the second swaged part 212*c* is swaged while the second swaged part 212*c* is inserted through the through hole 213*b* of the external terminal 213. Thus, the external terminal 213 is sandwiched by the body part 212*a* and the distal end of the second swaged part 212*c* deformed into a flange shape, and is compressed in the thickness direction between the upper surface (surface facing the second swaged part 212*c*) of the body part 212*a* and the distal end of the second swaged part 212*c* deformed into a flange shape, so as to be physically and electrically connected to the rivet member 212. The second swaged part 212*c* of this embodiment is swaged in advance before the first swaged part 212*b* is swaged.

Here, the dimensional relationship of the through hole 3*a* of the cover plate 203, the through hole 8*b* of the connector 8*a* of the current collector 8, the through hole 10*b* of the resin plate 10, the through hole 211*c* and the annular projection 211*d* of the outer gasket 211, and the first swaged part 212*b* of the rivet member 212 is described. As shown in detail in FIG. 9, the inner diameter of the through hole 3*a* of the cover plate 203 and the inner diameter of the through hole 10*b* of the resin plate 10 are equal or substantially equal to each other. Further, the inner diameter of the through hole 3*a* of the cover plate 203, the inner diameter of the through hole 10*b* of the resin plate 10, and the outer diameter of the annular projection 211*d* of the outer gasket 211 are equal or substantially equal to each other. Further, the length of the annular projection 211*d* of the outer gasket 211 and the total thickness of the cover plate 203 and the resin plate 10 are equal or substantially equal to each other. Further, the inner diameter of the annular projection 211*d* of the outer gasket 211 and the inner diameter of the through hole 8*b* of the connector 8*a* of the current collector 8 are equal or substantially equal to each other. Further, the inner diameter of the annular projection 211*d* of the outer gasket 211, the diameter of the through hole 8*b* of the connector 8*a* of the current collector 8, and the outer diameter of the first swaged part 212*b* of the rivet member 212 are equal or substantially equal to each other.

The body part 212*a* of the rivet member 212 is inserted into the recess 211*b* of the outer gasket 211, thereby allowing the first swaged part 212*b* of the rivet member 212 to be inserted through the through hole 8*b* of the connector 8*a* of the current collector 8 passing through the through hole 211*c* at the bottom of the recess 211*b*. The distal portion of the first swaged part 212*b* projecting downward from the through hole 8*b* of the connector 8*a* is swaged from below. Thus, the rivet member 212 is attached to the cover plate 203 while being electrically connected to the connector 8*a* of the current collector 8 and being insulated from the cover plate 203.

The external terminal 213 is a portion for electrical connection between the battery cell and an external device. The external terminal 213 of this embodiment has a rectangular plate shape wider than the upper surface of the second swaged part 212*c* of the rivet member 212. The external terminal 213 is made of aluminum alloy (specifically, A5052-H34 defined in JIS). In this embodiment, the Vickers hardness of the second swaged part 212*c* of the rivet member 212 and the peripheral region of the through hole 213*b* of the external terminal 213 is 110 HV and 80 HV, respectively. That is, the Vickers hardness of the negative electrode external terminal 213 is lower than the Vickers hardness of the rivet member 212.

Figure 11:
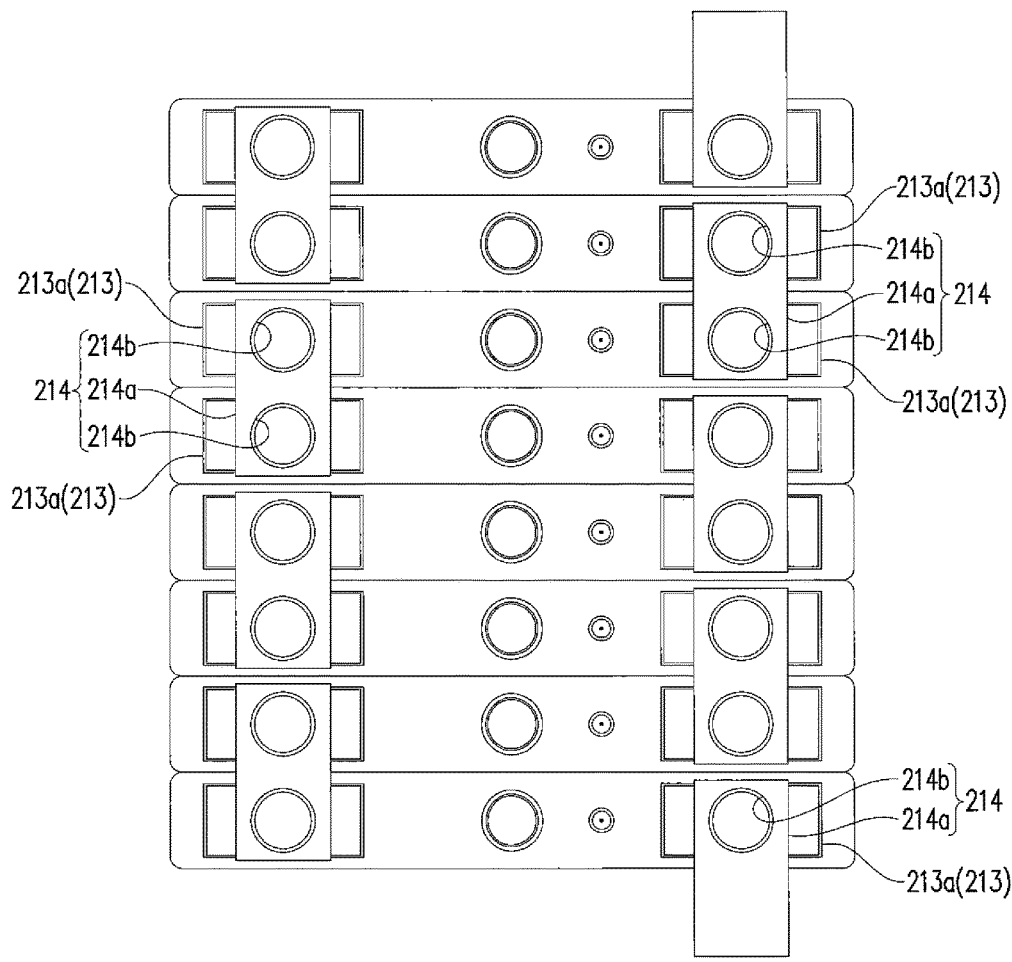
FIG. 11 is an enlarged sectional view of a battery module in which such battery cells are connected by bus bars.

When a plurality of battery cells are electrically connected to an external device, an electric storage apparatus (battery module) is formed by connecting conductor connection parts 213*a* of external terminals 213 of adjacent battery cells to each other by bus bars 214, as shown in FIG. 11. The bus bar 214 includes a conductive coupling member 214*a* and insertion holes 214*b* provided on both ends of the coupling member 214*a*. Among external terminals of a pair of battery cells to be connected, the coupling member 214*a* connects a positive electrode external terminal 213 of one battery cell to the negative electrode external terminal 213 of the other battery cell. The insertion holes 214*b* are provided at a position corresponding to the negative electrode external terminal 213 in the coupling member 214*a* and at a position corresponding to the positive electrode external terminal 213 in the coupling member 214*a*. The insertion holes 214*b* are holes with a size larger than the distal end of the negative electrode second swaged part 212*c* that is deformed into a flange shape by swaging the negative electrode second swaged part 212*c*. Further, the insertion holes 214*b* are holes with a size larger than the distal end of the positive electrode second swaged part 212*c* that is deformed into a flange shape by swaging the positive electrode second swaged part 212c. The insertion holes 214b of this embodiment have a circular shape.

When the bus bar 214 is connected to each external terminal 213, the distal end of the external terminal 213 deformed on a conductor connection part 213a into a flange shape is inserted through the corresponding one of the insertion holes 214b of the bus bar 214, and the conductor connection part 213a and the coupling member 214a are welded together by laser welding or the like. Thus, the negative electrode external terminal 213 and the positive electrode external terminal 213 are electrically connected to the bus bar 214.

In this embodiment, the second swaged part 212c of the negative electrode rivet member 212 serving as an insert part is inserted through the through hole 213b (insert-receiving part) of the external terminal 213 serving as a conductive member. Then, the distal end of the second swaged part 212c is swaged, thereby expanding on the conductor connection part 213a of the external terminal 213. However, at least the second swaged part 212c has a higher Vickers hardness than the peripheral region of the through hole 213b of the external terminal 213 that is in contact with the body part 212a, and therefore the peripheral region of the through hole 213b of the external terminal 213 is compressed and deformed in the thickness direction while the distal end of the second swaged part 212c expands on the conductor connection part 213a. This reduces the thickness of the peripheral region of the through hole 213b in the external terminal 213, thereby suppressing an increase in thickness of the external terminal 213.

Further, the second swaged part 212c of the rivet member 212 is inserted through the through hole 213b of the external terminal 213, and the distal end of the second swaged part 212c is swaged, thereby allowing the peripheral region of the through hole 213b of the external terminal 213 to be sandwiched between the swaged distal end and the body part 212a. This causes the peripheral region of the through hole 213b of the external terminal 213 to be compressed and deformed from both sides in the thickness direction, so that the thickness of the peripheral region of the through hole 213b is reduced. As a result, an increase in thickness of the external terminal 213 is suppressed.

Further, the body part 212a of the rivet member 212 has a non-circular shape as seen in the center axis direction of the through hole 213b of the external terminal 213. The rivet member 212 and the external terminal 213 are integrated together while the peripheral region of the through hole 213b of the external terminal 213 is compressed and deformed by the non-circular body part 212a. Therefore, in the case where an external force is applied to the external terminal 213, for example, when the rivet member 212 integrated with the external terminal 213 is fixed to a partition wall by swaging the first swaged part 212b, the motion of the external terminal 213 and the rivet member 212 to relatively rotate about the center axis of the through hole 231b is restricted.

In the above-described embodiment, an example in which the second swaged part 212c of the rivet member 212, which serves as an insert part, is inserted through the through hole 213b, which serves as an insert-receiving part, of the external terminal 213, which serves as a conductive member, and the distal end of the second swaged part 212c is swaged, thereby allowing the rivet member 212 and the external terminal 213 to be electrically connected to each other is described. However, the conductive member may be the current collector 8, and the insert-receiving part may be the through hole 8b.

Figure 12:
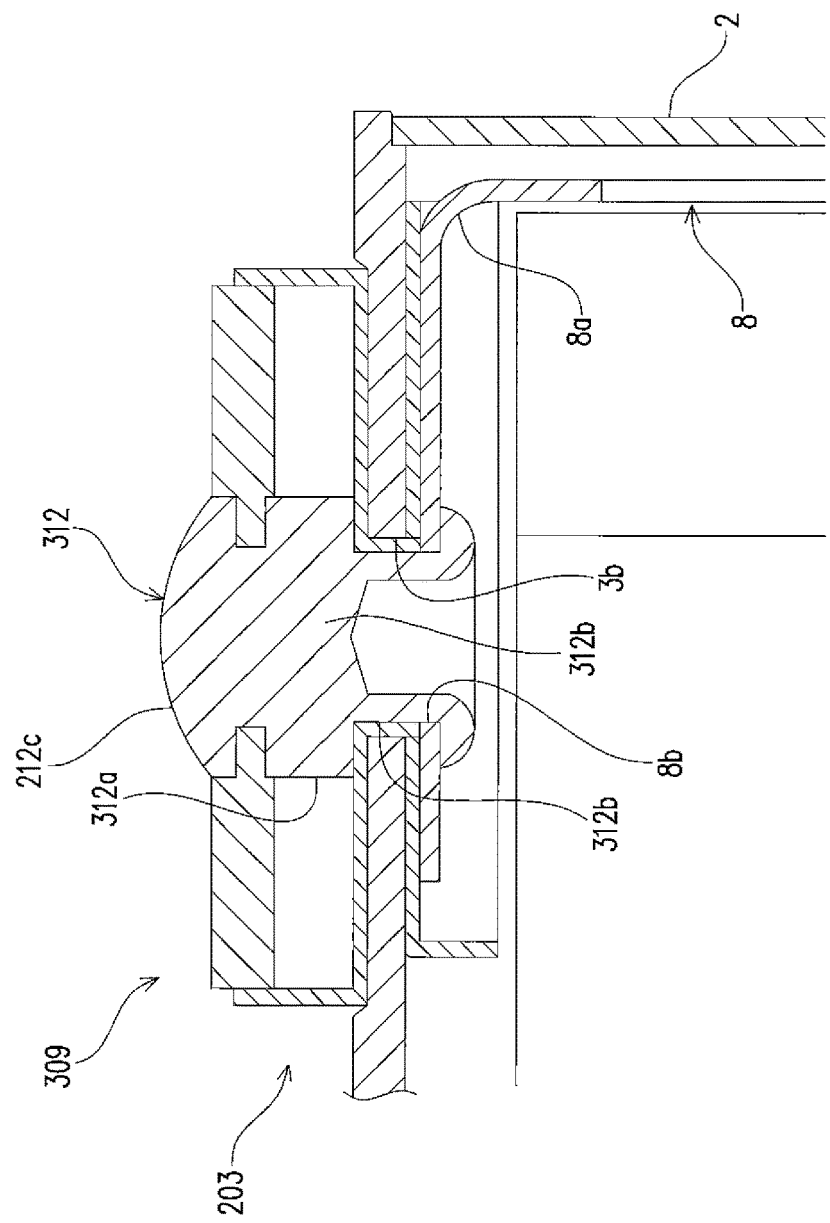
FIG. 12 is an enlarged sectional view of a terminal structure of a battery cell according to a fourth embodiment of the present invention.

FIG. 12 shows a specific example thereof. A rivet member 312 of such a positive electrode terminal structure 309 is a conductive metal member formed using copper alloy (specifically, C1100-H defined in JIS). The rivet member 312 includes a body part 312a that has a larger width than the through hole 8b of the current collector 8 and is in contact with the current collector 8, and a first swaged part 312b that is provided as an insert part protruding downward from the lower surface of the body part 312a. The positive electrode current collector 8 is a conductive metal member formed using aluminum alloy (specifically, A5052-H34 defined in JIS). In this embodiment, the Vickers hardness of the first swaged part 312b of the rivet member 312 and the peripheral region of the through hole 8b of the current collector 8 is 110 HV and 80 HV, respectively. That is, the Vickers hardness of the first swaged part 312b of the rivet member 312 is higher than the Vickers hardness of the peripheral region of the through hole 8b of the positive electrode current collector 8.

In this embodiment, the first swaged part 312b of the rivet member 312 serving as an insert part is inserted through the through hole 8b (insert-receiving part) of the connector 8a of the current collector 8 serving as a conductive member, and the distal end of the first swaged part 312b is swaged, thereby expanding on the connector 8a. However, at least the first swaged part 312b has a higher Vickers hardness than the peripheral region of the through hole 8b of the connector 8a, and therefore the peripheral region of the through hole 8b of the connector 8a is compressed and deformed in the thickness direction, with the distal end of the first swaged part 312b expanding on the connector 8a. This reduces the thickness of the peripheral region of the through hole 8b, thereby suppressing an increase in thickness of the connector 8a.

The electric storage device according to the present invention is not limited to the aforementioned embodiments, and various modifications can be made without departing from the gist of the present invention.

In the above-described embodiments, the body parts 12a, 112a, 212a, and 312a of the rivet members 12, 112, 212, and 312 have a shaft shape. However, there is no limitation to this. The body part of the rivet member is not limited to a specific shape as long as it has a shape that does not allow insertion through the cover plate, the current collector, or the like, through which the first swaged part is inserted. The body part of the rivet member, for example, may be in the form of a thin plate.

Further, in the above-described embodiments, examples in which the body parts 12a, 112a, 212a, and 312a of the rivet members 12, 112, 212, and 312 are formed integrally with the insert parts (the second swaged parts 12c and 212c, the insert part 112b, and the first swaged part 312b) are described. However, the rivet member may be configured so that the body part and the insert part of the rivet member are independently formed, and the body part and the insert part are connected to each other by welding.

Further, in the above-described embodiments, examples in which the insert-receiving parts (the first through holes 15a and 115a, the through hole 213b, and the through hole 8b) of the conductive members (the pulling members 15 and 115, the external terminal 213, and the connector 8a of the current collector 8) are holes with their openings having substantially the same shape in the thickness direction are described. However, there is no limitation to this. For example, as shown in FIG. 13 and FIG. 14, a first through hole 415a of a pulling member 415 may include, in the thickness direction, a first insert part 415b formed having the same cross sectional shape as the shape of the second swaged part 12c of the rivet member 12, and a second insert part 415c having a diameter increasing from the first through hole 415b into a tapered shape.

Further, in the above-described embodiments, examples in which the positive electrode current collector 8 and the positive electrode rivet members 12, 112, 212, and 312 are made of aluminum alloy, and the negative electrode current collector 8 and the negative electrode rivet members 12, 112, 212, and 312 are made of copper alloy are mentioned. However, the materials of the positive electrode current collector, the positive electrode rivet member, the negative electrode current collector, and the negative electrode rivet member can be arbitrarily selected as long as they are conductive metal materials corresponding to the type of the battery cell. Further, in the above-described embodiments, the materials of the pulling member 15, the external terminal 213 of the welding-type terminal structure 209, and the current collector 8, which serve as conductive members, are exemplified. However, the materials of the pulling member 15, the external terminal 213, and the current collector 8 also can be arbitrarily selected as long as the Vickers hardness of the rivet member is higher than the Vickers hardness of the conductive member.

That is, at least the insert part of the rivet member needs only to have a higher Vickers hardness than at least the peripheral region of the insert-receiving part of the conductive member. For example, the configuration may be such that the body part of the rivet member and the insert part are processed differently to be formed having a different Vickers hardness, and the peripheral region of the insert-receiving part of the conductive member and the other region are processed differently to be formed having a different Vickers hardness, thereby allowing the insert part of the rivet member to have a higher Vickers hardness than the peripheral region of the insert-receiving part of the conductive member.

Further, in the above-described embodiments, A5052-H34 defined in JIS is mentioned as an example of the material of aluminum alloy, and C1100-H defined in JIS is mentioned as an example of the material of copper alloy. However, other materials may be used as the aluminum alloy and the copper alloy as long as the Vickers hardness of the rivet member is higher than the Vickers hardness of the conductive member. For example, in the case where the material of the rivet member is C1100-H defined in JIS, the Vickers hardness of the peripheral region of the insert-receiving part of the conductive member needs only to be lower than the Vickers hardness of C1100-H defined in JIS. In this case, C1100-H defined in JIS subjected to annealing, for example, may be selected as the material of the conductive member, other than aluminum or aluminum alloy such as A1050-H24, A1100-O, A1100-H24, and A3003-H defined in JIS. Further, in the case where the material of the conductive member is A5052-H34 defined in JIS, the insert part of the rivet member needs only to have a higher Vickers hardness than A5052-H34 defined in JIS. In this case, A6061-T6 defined in JIS, for example, may be selected as the material of the rivet member, other than copper alloy such as C1020-H defined in JIS.

Here, the aforementioned A1050-H24, A1100-O, and A1100-H24 are pure aluminum. The A1050-H24 is obtained by work hardening the aluminum (A1050) shown in Table 5 below to a predetermined value or higher and thereafter reducing its strength by appropriate heat treatment (softening heat treatment) to a predetermined strength. The mechanical properties of the A1050-H24 are as shown in Table 6 below. The A1100-O is obtained by annealing the aluminum (A1100) shown in Table 5 below to the softest state, which is completely recrystallized. The mechanical properties of the A1100-O are as shown in Table 6 below. The A1100-H24 is obtained by work hardening the aluminum (A1100) shown in Table 5 below to a predetermined value or higher and thereafter reducing its strength by appropriate heat treatment (softening heat treatment) to a predetermined strength. The mechanical properties of the A1100-H24 are as shown in Table 6 below. Further, the A3003-H is Al—Mn based aluminum alloy. The A3003-H is obtained by work hardening the aluminum alloy (A3003) shown in Table 5 below. The mechanical properties of the A3003-H (A3003-H112, H12, H22, H14, H24, H16, H26, and H18) are as shown in Table 6 below. Further, the A6061-T6 is Al—Mg—Si based aluminum alloy. The A6061-T6 is obtained by quenching the aluminum alloy (A6061) shown in Table 5 below and thereafter tempering it. The mechanical properties of the A6061-T6 are as shown in Table 6 below. The alphabet "P" shown in the column of DESIGNATION of Table 6 after each of the A1050, A1100, A3003, and A6061 is a symbol indicating that a test piece has a plate shape.

TABLE 5

CHEMICAL COMPOSITIONS

| ALLOY No. | CLADDING MATERIAL | Si | Fe | Cu | Mn | Mg | Cr | Zn | Zr, Zr + Ti, Ca, V | Ti | OTHERS INDIVIDUAL | TOTAL | Al |
|---|---|---|---|---|---|---|---|---|---|---|---|---|---|
| A 1050 | — | Not more than 0.25 | Not more than 0.40 | Not more than 0.05 | Not more than 0.05 | Not more than 0.05 | — | Not more than 0.05 | Not more than 0.05 | Not more than 0.03 | Not more than 0.03 | — | Not more than 99.50 |
| A 1100 | — | Si + Fe Not more than 0.95 | | 0.05-0.20 | Not more than 0.05 | — | — | Not more than 0.10 | — | — | Not more than 0.05 | Not more than 0.15 | Not more than 99.00 |
| A 3003 | — | Not more than 0.6 | Not more than 0.7 | 0.05-0.20 | 1.0-1.5 | — | — | Not more than 0.10 | — | — | Not more than 0.05 | Not more than 0.15 | RESIDUAL |
| A 6061 | — | 0.48-0.8 | Not more than 0.7 | 0.15-0.40 | Not more than 0.15 | 0.8-1.2 | 0.04-0.35 | Not more than 0.25 | — | Not more than 0.15 | Not more than 0.05 | Not more than 0.15 | RESIDUAL |

UNIT: %

TABLE 6

| DESIGNATION | TEMPER | MECHANICAL PROPERTIES ||||||
| --- | --- | --- | --- | --- | --- | --- | --- |
| | | TENSILE TEST |||| BENDING TEST ||
| | | THICKNESS mm | TENSIL STRENGTH N/mm² | YIELD STRENGTH N/mm² | ELONGATION % | THICKNESS mm | INSIDE RADIUS |
| A 1050P | H24 | At least 0.2 and not more than 0.3 | | — | At least 1 | | |
| | | More than 0.3 and not more than 0.5 | | — | At least 2 | | |
| | | More than 0.5 and not more than 0.8 | At least 95 | — | At least 3 | At least 0.2 and not more than 0.8 | 0.5 times the thickness |
| | | More than 0.8 and not more than 1.3 | Not more than 125 | At least 75 | At least 4 | More than 0.8 and not more than 6 | The same as the thickness |
| | | More than 1.3 and not more than 2.9 | | At least 75 | At least 5 | | |
| | | More than 2.9 and not more than 12 | | At least 75 | At least 6 | | |
| A 1100P | 0 | At least 0.2 and not more than 0.5 | | — | At least 15 | | |
| | | More than 0.5 and not more than 0.8 | | — | At least 20 | | |
| | | More than 0.8 and not more than 1.3 | At least 75 | At least 25 | At least 25 | At least 0.2 and not more than 6 | Adhered |
| | | More than 1.3 and not more than 6.5 | Not more than 110 | At least 25 | At least 30 | | |
| | | More than 6.5 and not more than 75 | | At least 25 | At least 28 | | |
| | H14 H24 | At least 0.2 and not more than 0.3 | | — | At least 1 | | |
| | | More than 0.3 and not more than 0.5 | | — | At least 2 | | |
| | | More than 0.5 and not more than 0.8 | At least 120 | — | At least 3 | At least 0.2 and not more than 6 | The same as the thickness |
| | | More than 0.8 and not more than 1.3 | Not more than 145 | At least 95 | At least 4 | | |
| | | More than 1.3 and not more than 2.9 | | At least 95 | At least 5 | | |
| | | More than 2.9 and not more than 12 | | At least 95 | At least 6 | | |

| DESIGNATION | TEMPER | MECHANICAL PROPERTIES ||||||
| --- | --- | --- | --- | --- | --- | --- | --- |
| | | TENSILE TEST |||| BENDING TEST ||
| | | THICKNESS mm | TENSIL STRENGTH N/mm² | YIELD STRENGTH N/mm² | ELONGATION % | THICKNESS mm | INSIDE RADIUS |
| A 3003P | H112 | At least 4 and not more than 13 | At least 120 | At least 70 | At least 8 | | |
| | | More than 13 and not more than 50 | At least 110 | At least 40 | At least 12 | — | — |
| | | More than 50 and not more than 75 | At least 100 | At least 40 | At least 18 | | |
| | H12 H22 | At least 0.2 and not more than 0.3 | | — | At least 2 | | |
| | | More than 0.3 and not more than 0.5 | | — | At least 3 | | |
| | | More than 0.5 and not more than 0.8 | | — | At least 4 | | |
| | | More than 0.8 and not more than 1.3 | At least 120 | At least 85 | At least 5 | At least 0.2 and not more than 6 | 0.5 times the thickness |
| | | More than 1.3 and not more than 2.9 | Not more than 155 | At least 85 | At least 6 | | |
| | | More than 2.9 and not more than 4 | | At least 85 | At least 7 | | |

-continued

| DESIGNATION | TEMPER | THICKNESS mm | TENSILE TEST TENSIL STRENGTH N/mm² | YIELD STRENGTH N/mm² | ELONGATION % | BENDING TEST THICKNESS mm | INSIDE RADIUS |
|---|---|---|---|---|---|---|---|
| | | More than 4 and not more than 6.5 | | At least 85 | At least 8 | | |
| | | More than 6.5 and not more than 12 | | At least 85 | At least 9 | | |
| | H14 H24 | At least 0.2 and not more than 0.3 | | — | At least 1 | | |
| | | More than 0.3 and not more than 0.5 | | — | At least 2 | | |
| | | More than 0.5 and not more than 0.8 | | — | At least 3 | | |
| | | More than 0.8 and not more than 1.3 | At least 135 | At least 120 | At least 4 | At least 0.2 and not more than 2.9 | The same as the thickness |
| | | More than 1.3 and not more than 2.9 | Not more than 175 | At least 120 | At least 5 | More than 2.9 and not more than 6 | 1.5 times the thickness |
| | | More than 2.9 and not more than 4 | | At least 120 | At least 6 | | |
| | | More than 4 and not more than 6.5 | | At least 120 | At least 7 | | |
| | | More than 6.5 and not more than 12 | | At least 120 | At least 8 | | |
| | H16 H26 | At least 0.2 and not more than 0.5 | | — | At least 1 | | |
| | | More than 0.5 and not more than 0.8 | At least 165 | — | At least 2 | At least 0.2 and not more than 1.3 | 2 times the thickness |
| | | More than 0.8 and not more than 1.3 | Not more than 205 | At least 145 | At least 3 | More than 1.3 and not more than 2.9 | 2.5 times the thickness |
| | | More than 1.3 and not more than 4 | | At least 145 | At least 4 | More than 2.9 and not more than 4 | 3 times the thickness |
| | H18 | At least 0.2 and not more than 0.5 | | — | At least 1 | | |
| | | More than 0.5 and not more than 0.8 | | — | At least 2 | | |
| | | More than 0.8 and not more than 1.3 | Not more than 185 | At least 165 | At least 3 | — | — |
| | | More than 1.3 and not more than 3 | | At least 165 | At least 4 | | |
| A 6061P | T6 | | | | | At least 0.4 and not more than 0.5 | 1.5 times the thickness |
| | | At least 0.4 and not more than 0.5 | At least 295 | — | At least 8 | More than 0.5 and not more than 1.6 | 2 times the thickness |
| | | More than 0.5 and not more than 6.5 | | At least 245 | At least 10 | More than 1.6 and not more than 2.9 | 2.5 times the thickness |
| | | | | | | More than 2.9 and not more than 6 | 3 times the thickness |

Further, the C1020-H is obtained by work hardening the oxygen-free copper (C1020) shown in Table 7 below. The mechanical properties of the C1020-H are as shown in Table 8 below. The alphabet "P" shown in the column of DESIGNATION of Table 8 after the C1020 is a symbol indicating that a test piece has a plate shape.

TABLE 7

| CHEMICAL COMPOSITIONS |
|---|
| ALLOY | CHEMICAL COMPOSITION |

| No. | Cu | Pb | Fe | Sn | Zn | Al | Mn | Ni | P | OTHERS |
|---|---|---|---|---|---|---|---|---|---|---|
| C 1020 | At least 99.96 | — | — | — | — | — | — | — | — | — |

UNIT: %

TABLE 8

MECHANICAL PROPERTIES

| ALLOY No. | TEMPER | DESIG- NATION | TENSILE TEST | | | BENDING TEST | | | HARDNESS TEST VICKERS | |
|---|---|---|---|---|---|---|---|---|---|---|
| | | | THICK- NESS mm | TENSIL STRENGTH N/mm$^2$ | ELON- GATION % | THICK- NESS mm | BENDING ANGLE | INSIDE RADIUS | THICK- NESS mm | HARD- NESS HV |
| C 1020 | H | C 1020 P-H | At least 0.15 and less than 0.3 At least 0.3 and not more than 10 | At least 275 | — | Not more than 2 | 180° | 1.5 times the thick- ness | At least 0.3 | At least 80 |

Further, in the above-described embodiments, examples of the insert part (the second swaged parts 12c and 212c, the insert part 112b, and the first swaged part 312b) having a circular shape is described. However, the insert part may have a non-circular shape. For example, the insert-receiving part may have an elliptical shape or oblong shape. With such a configuration, when the distal end of the insert part is swaged while the rivet member is supported by any means such as a tool and jig, the motion of the conductive member to rotate about the center axis due to the swaging action force on the distal end of the conductive member is restricted. Thus, when the distal end of the insert part of the rivet member is swaged, the relative rotation between the rivet member and the conductive member can be suppressed.

Further, in the above-described embodiments, examples in which the insert-receiving part is a hole are described. However, the insert-receiving part may be a recess formed by recessing the edge of the conductive member in the width direction as long as the insert part can be inserted therein.

Further, the electrode assembly is not limited to the elongated cylindrical electrode assembly of wound type as described in the above-described embodiments, and may have another shape. For example, the electrode assembly may be of stacked type in which a plurality of negative electrode sheets 5 and a plurality of positive electrode sheets 6 are alternately stacked via separators 7.

Further, in the above-described embodiments, examples in which the terminal structures 9, 109, 209, and 309 are provided on the cover plates 3 and 203 are mentioned. However, the terminal structure may be provided in the case body 2. That is, the rivet member may pass through the case body 2. The case body 2 may be formed using a metal material other than aluminum alloy.

Further, a lithium ion secondary battery cell has been described in the above-described embodiments. However, the type and size (capacity) of battery cells are arbitrarily selected.

Further, the present invention is not limited to the lithium ion secondary battery cells. For example, the present invention can be applied also to primary battery cells and capacitors such as an electric double layer capacitor in addition to various secondary battery cells.

REFERENCE SIGNS LIST

1: Case
2: Case Body
3: Cover Plate
3a: Through Hole
3b: Recess
4: Electrode Assembly
5: Negative Electrode Sheet
6: Positive Electrode Sheet
7: Separator
8: Current Collector
8a: Connector
8b: Through Hole
9: Terminal Structure
10: Resin Plate
10a: Recess
10b: Through Hole
11: Outer Gasket
11a: Outer Wall
11b: Recess
11c: Through Hole
11d: Annular Projection
12: Rivet Member (Conductive Member)
12a: Body Part
12b: First Swaged Part
12c: Second Swaged Part (Insertion Part)
12d: Non-Through Hole
12e: Bottom
13: Terminal Anti-Rotation Member
14: Terminal Bolt
15: Pulling Member
15a: First Through Hole (Insert-Receiving Part)
15b: Second Through Hole
109: Terminal Structure
110: Resin Plate
111: Outer Gasket
112: Rivet Member
112a: Body Part
112b: Insert Part
115: Pulling Member (Conductive Member)
115a: First Through Hole
203: Cover Plate
203b: Recess
209: Terminal Structure
211: Outer Gasket
211a: Outer Wall
211b: Recess
211c: Through Hole
211d: Annular Projection
212: Rivet Member
212a: Body Part
212b: First Swaged Part
212c: Second Swaged Part (Insertion Part)
212d: Non-Through Hole
212e: Bottom 213: External Terminal (Conductive Member)
213a: Conductor Connection Part
213b: Through Hole (Insert-Receiving Part)
214: Bus Bar
214a: Coupling Member
214b: Insertion Hole
309: Terminal Structure
312: Rivet Member
312a: Body Part
312b: First Swaged Part (Insertion Part)
409: Terminal Structure
415: Pulling Member (Conductive Member)
415a: First Through Hole
415b: First Perforated Portion
415c: Second Perforated Portion
512: Rivet Member
512a: Body Part
512c: Second Swaged Part
515: Pulling Member

The invention claimed is:

1. An electric storage device, comprising:
an electrode assembly comprising a positive electrode plate and a negative electrode plate at are insulated from each other;
a case constituted by a partition wall, the case housing the electrode assembly;
a rivet member comprising a first insert part provided on one end, a second insert part provided on an other end, and a body part joined to the first insert part and the second insert part, the rivet member being fixed to the partition wall;
a first conductive member comprising a first insert-receiving part through which the first insert part is inserted, the first conductive member being electrically connected to the rivet member; and
a second conductive member comprising a second insert-receiving part through which the second insert part is inserted, the second conductive member being electrically connected to the rivet member,
wherein the first insert part has a higher Vickers hardness than a peripheral region of the first insert-receiving part of the first conductive member,
wherein the first insert part comprises, at a distal end of the first insert part, a swaged part that is swaged while the first insert part is inserted through the first conductive member,
wherein the second insert part comprises, at a distal end of the second insert part, another swaged part that is swaged while the second insert part is inserted through the second conductive member,
wherein the body part has a larger width dimension in a direction intersecting an insertion direction of the first insert part than the first insert-receiving part, and is in contact with the first conductive member,
wherein the body part has a higher Vickers hardness than a region of the first conductive member in contact with the body part, and
wherein the peripheral region of the first insert-receiving part of the first conductive member includes a tapered portion that is compressed and deformed in the insertion direction, and sandwiched between the swaged part and the body part of the rivet member.

2. The electric storage device according to claim 1, wherein the body part has a non-circular shape as seen in a center axis direction of the first insert-receiving part.

3. The electric storage device according to claim 1, wherein the first insert part has a non-circular shape as seen in a center axis direction of the first insert-receiving part, and
wherein the second insert part has a non-circular shape as seen in a center axis direction of the second insert-receiving part.

4. An electric storage device, comprising:
an electrode assembly comprising a positive electrode plate and a negative electrode plate that are insulated from each other;
a case constituted by a partition wall, the case housing the electrode assembly;
a rivet member comprising a first insert part provided on one end and a body part joined to the first insert part, the rivet member being fixed to the partition wall; and
a first conductive member comprising a first insert-receiving part through which the first insert part is inserted, the first conductive member being electrically connected to the rivet member,
wherein the body part has a larger width in a direction intersecting an insertion direction of the first insert part than the first insert-receiving part, and is in contact with the first conductive member,
wherein the body part has a higher Vickers hardness than a region of the first conductive member in contact with the body part,
wherein the first insert part comprises, at a distal end of the first insert part, a swaged part that is swaged while the first insert part is inserted through the first conductive member, and
wherein a peripheral region of the first insert-receiving part of the first conductive member includes a tapered portion that is compressed and deformed in the insertion direction, and sandwiched between the swaged part and the body part of the rivet member.

5. The electric storage device according to claim 4, wherein the body part has a non-circular shape as seen in the center axis direction of the first insert-receiving part.

6. The electric storage device according to claim 4,
wherein the first insert part includes a copper alloy, and
wherein the first insert-receiving part of the first conductive member comprises one of aluminum or an aluminum alloy, and an annealed material including the cooper alloy.

7. The electric storage device according to claim 6, wherein the body part includes the copper alloy.

8. The electric storage device according to claim 7, wherein the body part has a non-circular shape as seen in a center axis direction of the first insert-receiving part.

9. The electric storage device according to claim 6, wherein the first insert part has a non-circular shape as seen in a center axis direction of the first insert-receiving part.

10. An electric storage apparatus, comprising:
at least two electric storage devices including at least one electric storage device set forth in claim 1; and
a bus bar coupling the at least two electric storage devices to each other.

11. The electric storage apparatus according to claim 10, wherein the bus bar is stacked on the conductive member, and the bus bar includes an insertion hole larger than the swaged part in a region overlapping the swaged part.

12. The electric storage device according to claim 1, wherein the first insert part includes a copper alloy.

13. The electric storage device according to claim 12, wherein the first insert-receiving part of the first conductive member comprises aluminum or an aluminum alloy, and an annealed material including the copper alloy.

14. The electric storage device according to claim 4, wherein the first insert part includes a copper alloy.

15. The electric storage device according to claim 14, wherein the first insert-receiving part of the first conductive member comprises aluminum or an aluminum alloy, and an annealed material including the copper alloy.

16. The electric storage device according to claim 6, wherein the rivet member further comprises a second insert part on an other end of the rivet member,
   wherein the electric storage device further comprises a second conductive member comprising a second insert-receiving part through which the second insert part is inserted, and
   wherein the second insert part comprises, at a distal end of the second insert part, a second swaged part that is swaged while the second insert part is inserted through the second conductive member.

\* \* \* \* \*